(12) United States Patent
Komura

(10) Patent No.: US 8,670,318 B2
(45) Date of Patent: *Mar. 11, 2014

(54) COMMUNICATION METHOD AND TRANSMITTING APPARATUS UTILIZING THE SAME

(75) Inventor: Mayumi Komura, Gifu (JP)

(73) Assignee: Kyocera Corporation, Kyoto-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/570,040

(22) Filed: Aug. 8, 2012

(65) Prior Publication Data

US 2012/0300626 A1 Nov. 29, 2012

Related U.S. Application Data

(63) Continuation of application No. 12/326,853, filed on Dec. 2, 2008, now Pat. No. 8,259,572.

(51) Int. Cl.
*H04L 1/00* (2006.01)
(52) U.S. Cl.
USPC ............... 370/231; 370/522; 455/450.68
(58) Field of Classification Search
USPC ............... 370/231, 522; 455/450.68
See application file for complete search history.

(56) References Cited

U.S. PATENT DOCUMENTS

| | | | |
|---|---|---|---|
| 2005/0002525 A1* | 1/2005 | Alkove et al. | 380/37 |
| 2007/0060167 A1* | 3/2007 | Damnjanovic et al. | 455/450 |
| 2007/0081602 A1* | 4/2007 | Tanaka et al. | 375/260 |
| 2008/0186916 A1* | 8/2008 | Oshiba et al. | 370/330 |
| 2008/0209301 A1* | 8/2008 | Chang et al. | 714/749 |
| 2010/0290419 A1* | 11/2010 | Wengerter | 370/329 |

FOREIGN PATENT DOCUMENTS

JP 2006270941 10/2006

OTHER PUBLICATIONS

JP2007-148134 Office Action mailed Oct. 11, 2011, 4 pages.
Kliazovich, Dzmitry. "Cross-Layer Performance Optimization in Wireless Local Area Networks." (Dec. 2006) http://disi.unitn.it/~klezovic/papers/PhD-Thesis.pdf.

* cited by examiner

*Primary Examiner* — Wanda Z Russell
(74) *Attorney, Agent, or Firm* — Duane Morris LLP

(57) ABSTRACT

An IF unit to an RF unit generate a packet signal containing a control signal and a data signal and transmits the thus generated packet signal. A radio control unit performs a first retransmission control or a second retransmission control on the packet signal transmitted. The radio control unit causes the IF unit to the RF unit to have first control information for the first retransmission control contained in the control signal and have second control information for the second retransmission control contained in the data signal.

11 Claims, 16 Drawing Sheets

| A0 | A1 | A2 | A3 | A4 | A5 | A6 | A7 | A8 |

FIG.9B

| X0 | X1 | X2 | X3 | X4 | X5 | X6 | X7 | X8 |
| Y0 | Y1 | Y2 | Y3 | Y4 | Y5 | Y6 | Y7 | Y8 |

FIG.9C

| X0 |    | X2 | X3 |    | X5 | X6 |    | X8 |
| Y0 | Y1 |    | Y3 | Y4 |    | Y6 | Y7 |    |

FIG.9D

| Y0 | X0 | Y1 | X2 | Y3 | X3 | Y4 | X5 | Y6 | X6 | Y7 | X8 |

FIG.9E

| X0 |    | X2 | X3 |    | X5 | X6 |    | X8 |
| Y0 | Y1 |    | Y3 | Y4 |    | Y6 | Y7 |    |

FIG.9F

|    | X1 |    |    | X4 |    |    | X7 |    |
|    |    | Y2 |    |    | Y5 |    |    | Y8 |

FIG.9G

| X1 | Y2 | X4 | Y5 | X7 | Y8 |

FIG.9H

|    | X1 |    |    | X4 |    |    | X7 |    |
|    |    | Y2 |    |    | Y5 |    |    | Y8 |

FIG.9I

| X0 | X1 | X2 | X3 | X4 | X5 | X6 | X7 | X8 |
| Y0 | Y1 | Y2 | Y3 | Y4 | Y5 | Y6 | Y7 | Y8 |

FIG.10A

| MI (4) | MR (4) | RESERVED (4) | HC (4) | HA (4) | ED (4) |
|---|---|---|---|---|---|

FIG.10B

| MI (4) | MR (4) | PC (2) | TC (2) | HC (4) | HA (4) | ED (4) |
|---|---|---|---|---|---|---|

FIG.10C

| 4 | 3 | 2 | 1 |
|---|---|---|---|
| WITH/WITHOUT RETRANSMISSION | TYPE OF PUNCTURE | HARQ SN | |

FIG.10D

| 4 | 3 | 2 | 1 |
|---|---|---|---|
| WITH/WITHOUT ACK | TYPE OF ACK | HARQ ACK SN | |

FIG.13A

| | | MSB | | | | | | | |
|---|---|---|---|---|---|---|---|---|---|
| | | 8 | 7 | 6 | 5 | 4 | 3 | 2 | 1 |
| | CI | | | | | | | | |
| DATA | MAC Header | 0 | 0 | 0 | 0 | 0 | 0 | 0 | |
| | | Len | | | | | | | |
| | Payload | SDU (MIN. 17byte, MAX. 265byte) | | | | | | | |
| CRC | | 2byte | | | | | | | |

LSB

FIG.13B

| | | MSB | | | | | | | |
|---|---|---|---|---|---|---|---|---|---|
| | | 8 | 7 | 6 | 5 | 4 | 3 | 2 | 1 |
| | CI | | | | | | | | |
| DATA | MAC Header | 0 | 0 | 1 | 0 | 0 | 0 | 0 | |
| | | Len | | | | | | | |
| | | SN | | | | | | | |
| | Payload | SDU (MIN. 16byte, MAX. 264byte) | | | | | | | |
| CRC | | 2byte | | | | | | | |

LSB

FIG.13C

| | | | MSB | | | | | | | |
|---|---|---|---|---|---|---|---|---|---|---|
| | | | 8 | 7 | 6 | 5 | 4 | 3 | 2 | 1 |
| | CI | | | | | | | | | |
| DATA | MAC Header | | 1 | 0 | 0 | 0 | 0 | 0 | 0 | |
| | | | Len | | | | | | | |
| | Payload | PSH | RESERVED | | | | | | | |
| | | | Len | | | | | | | |
| | | SDU | SDU #1 | | | | | | | |
| | | PSH | RESERVED | | | | | | | |
| | | | Len | | | | | | | |
| | | SDU | SDU #2 | | | | | | | |
| | | ⋮ | ⋮ | | | | | | | |
| CRC | | | 2byte | | | | | | | |

LSB

COMMUNICATION METHOD AND TRANSMITTING APPARATUS UTILIZING THE SAME

CROSS-REFERENCE TO RELATED APPLICATIONS

This application is a continuation of U.S. application Ser. No. 12/326,853 titled "Communication Method And Transmitting Apparatus Utilizing The Same," filed on Dec. 2, 2008, now U.S. Pat. No. 8,259,572 the entirety of which is incorporated by reference herein.

BACKGROUND OF THE INVENTION

1. Field of the Invention

The present invention relates to a communication technique, in particular, to a communication method for performing retransmission control between a transmitting apparatus and a receiving apparatus, and the transmitting apparatus utilizing the method. Also, the present invention relates to a communication technique, in particular, a communication method for performing communications between a transmitting apparatus and a receiving apparatus, and the transmitting apparatus utilizing the method.

2. Description of the Related Art

In a mobile communication system comprised of a radio base station and a radio mobile station, the radio base station assigns a channel to the radio mobile station as a resource. Also, communications are performed between the radio base station and the radio mobile station using the assigned channel as described, for example, in Japanese Patent Application Publication No. 2006-270941.

In wireless communication, it is generally desired that the limited frequency resources be used effectively. With a growing communication rate in particular, such a demand is ever increasing. One of technologies that meet this request is a technique called OFDMA (Orthogonal Frequency Division Multiple Access). This scheme can be combined with TDMA/TDD. OFDMA is a technique where a plurality of terminal apparatuses are frequency-multiplexed using OFDM. In such OFDMA, a sub-channel is formed by a plurality of subcarriers, and a multicarrier signal is formed by a plurality of sub-channels.

The combining of the OFDMA scheme and the TDMA scheme allows the multicarrier signal to be divided into a plurality of time slots on the temporal axis. As a result, a base station apparatus performs data communication with a terminal apparatus by allocating a sub-channel in at least one time slot to the terminal apparatus.

In order to improve the accuracy in the data communication, retransmission control is performed. In the retransmission control, sequence numbers are assigned to identify erroneous data. Such sequence numbers are said to be more important than the data. For this reason, the degree of reliability for communications through which the sequence numbers are transmitted should be set higher than the degree of reliability for communications through which data are transmitted. In order to cope with this, it is effective to define a field for use in control signal separately from a field for use in data and have a sequence number contained in the field for use in control signal. In so doing, the modulation scheme or the coding rate of error correction for the field for use in control signal is set to a more robust modulation scheme or a value higher than the value of the coding rate of error correction for the field for use in data.

There are cases where a plurality of kinds of retransmission controls are defined and any one of them is selected by a terminal apparatus and a base station apparatus when performing communication. When the type of retransmission control differs from one another, the length of the sequence numbers required or other information also differs.

Hereinafter, the sequence numbers, other information and the like required for the retransmission control are referred to as "control information". Accordingly, if a plurality of kinds of retransmission controls are to be all dealt with, the size of control information will be large. At the same time, in view of transmission efficiency, a design is made so that the size of the field for use in control signal becomes smaller. Even in such a case, the control information is required for retransmission control. Also, it is preferable that any change in the control information be properly dealt with in order to flexibly respond to the change of parameters in the retransmission control.

Since there are a plurality of kinds of data communication contents, there are a plurality of kinds of data assigned to each sub-channel. Generally, when the type of data differs, the quality required also differs. For example, audio data used for telephone communication or image data used for video telephones require the real-timeliness. The real-timeliness is not required for information data used for the file transfer. Instead, the accuracy is required for the information data used for the file transfer. Further, the control signal used to control the above-described data communication is assigned to the sub-channel as data.

Under such circumstances, the inventor of the present invention had come to recognize the following problems to be resolved. When the size of a sub-channel is defined beforehand, there are cases where the size of data to be transmitted is smaller than the size of the sub-channel. In such a case, the transmission efficiency will be improved if still another data can be assigned to the sub-channel. However, as described above, there are a plurality of kinds of data, so that there exists a combination of data which should not be contained in a single channel.

SUMMARY OF THE INVENTION

The present invention has been made under the foregoing circumstances, and an advantage of the present invention resides in providing a communication technology that defines control information compatible with a plurality of kinds of retransmission controls if the plurality of kinds of retransmission controls are defined. Another advantage thereof resides in providing a communication technology that aggregates at least two pieces of data by taking the compatibility of combination into account even though there are a plurality of kinds of data.

In order to resolve the above problems, a transmitting apparatus according to one embodiment of the present invention comprises: a generator which generates a packet signal containing a control signal and a data signal; a transmitter which transmits the packet signal generated by the generator; and a control unit which performs a first retransmission control or a second retransmission control on the packet signal transmitted by the transmitter. The generator has first control information for the first retransmission control contained in the control signal and has second control information for the second retransmission control contained in the data signal.

Another embodiment of the present invention relates to a communication method. This method comprises: generating a packet signal that contains a control signal and a data signal; transmitting the packet signal generated; and performing a first retransmission control or a second retransmission control on the packet signal transmitted. The generating is such that first control information for the first retransmission control is contained in the control signal, and second control information for the second retransmission control is contained in the data signal.

Still another embodiment of the present invention relates also to a transmitting apparatus. This apparatus comprises: a transmitter which transmits a packet signal containing a payload; and a control unit which determines any one of aggregating a plurality of data signals, aggregating a data signal and a control signal, and no aggregating for the payload contained in the packet signal to be transmitted from the transmitter. The transmitter defines the presence or absence of retransmission control and a plurality of types of retransmission controls, and when retransmission control is performed by the transmitter and the types of retransmission controls agree, the control unit determines to aggregate the plurality of data; and when retransmission control is performed by the transmitter but the types of retransmission controls do not agree, the control unit determines to aggregate the data signal and the control signal.

Still another embodiment of the present invention relates also to a communication method. This method comprises: determining any one of aggregating a plurality of data signals, aggregating a data signal and a control signal, and no aggregating for a payload contained in a packet signal; and transmitting the packet signal containing the payload. The transmitting defines the presence or absence of retransmission control and a plurality of types of retransmission controls, and when retransmission control is performed and the types of retransmission controls agree, the determining determines the aggregating of the plurality of data; and when retransmission control is performed but the types of retransmission controls do not agree, the determining determines the aggregating of the data signal and the control signal.

Optional combinations of the aforementioned constituting elements, and implementations of the invention in the form of methods, apparatuses, systems, recording mediums, computer programs and so forth may also be practiced as additional modes of the present invention.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 2C shows a structure of a frame in the communication system of FIG. 1;

FIGS. 9A to 9I show a brief overview of HARQ controlled by the radio control unit of FIG. 5;

FIGS. 10A to 10D show a structure of signal symbols generated by the radio control unit of FIG. 5;

FIGS. 13A to 13C show a structure of data symbols generated by the radio unit of FIG. 5.

DETAILED DESCRIPTION OF EXEMPLARY EMBODIMENTS OF THE INVENTION

Figure 1:
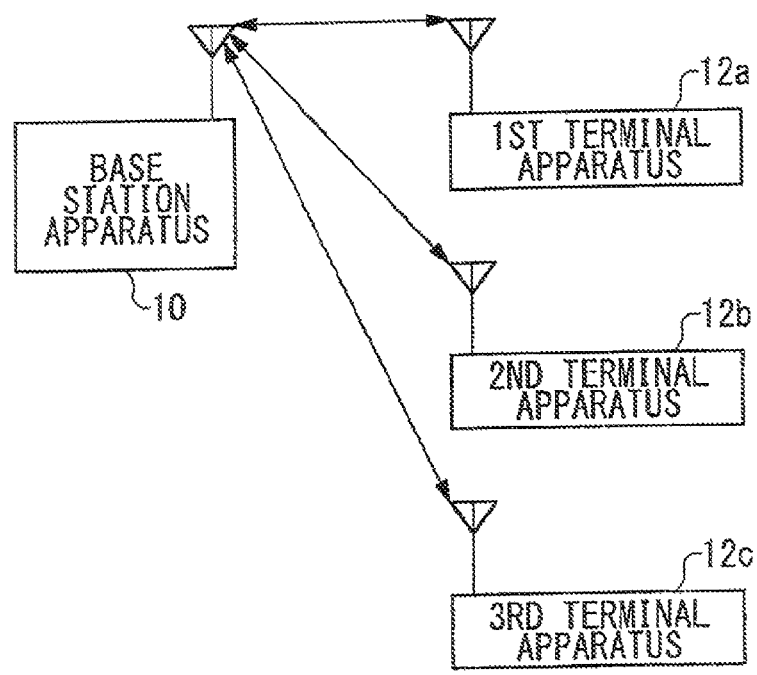
FIG. 1 shows a structure of a communication system according to an exemplary embodiment of the present invention.

The invention will now be described by reference to the exemplary embodiments. This does not intend to limit the scope of the present invention, but to exemplify the invention.

The present invention will be outlined below before it is described in detail. Exemplary embodiments of the present invention relate to a communication system comprised of a base station apparatus and at least one terminal apparatus. In the communication system, each frame is formed when a plurality of time slots are time-division multiplexed. And each time slot is formed when a plurality of sub-channels are frequency-division multiplexed. Each sub-channel is formed by a multicarrier signal. Here, the OFDM signal is used as the multicarrier signal, and the OFDMA scheme is used as a frequency division multiplexing. The OFDMA scheme is a technique where a plurality of terminal apparatuses are frequency-multiplexed using OFDM. The base station apparatus communicates with a plurality of terminal apparatuses by allocating a plurality of sub-channels contained in each time slot to their respective terminal apparatuses.

Each of a plurality of sub-channels contained in each time slot corresponds to a packet signal. The packet signal is formed such that a training signal is assigned in the beginning of the packet signal, a control signal is assigned posterior to the training signal and a data signal is assigned posterior to the control signal. Here, the control signal and the data signal assigned in such a manner are called "signal symbol" and "data symbol", respectively. The data symbol contains a MAC header and a payload, and data is assigned in the payload. Since in general the control signal is more important information than the data signal, the signal symbol requires higher reliability than the data symbol does. Accordingly, the modulation multi-level number for the signal symbol is set smaller than that for the data symbol.

In the communication system, a plurality of kinds of retransmission controls are defined. Items and parameter values of control information differ according to the kinds of retransmission controls. Normally, the control information is more important information than the data signal, so that the control information should be contained in the signal symbol. However, since the data size of signal symbol is limited, there are cases where the control information cannot be contained in the signal symbol depending on the type of the control information. Also, there is a need that the items or parameter values of the control information be changed at a later date depending on the type of retransmission control. Thus it is desired that the control information can be flexibly changed. In order to cope with this, the communication system according to the present exemplary embodiment executes the following processings.

The communication system defines ARQ and HARQ as retransmission controls. In accordance with these, control information for use in ARQ and information for use in HARQ are also defined. Though discussed later, assume that the data size of control information for HARQ is smaller that that of information for ARQ. Consequently, the communication system defines the control information for HARQ in such a manner as to be contained in a signal symbol, and defines the control information for ARQ in such a manner as to be contained in a MAC header of data symbol. Since the MAC header is contained in the data symbol, the format can be changed easier than the signal symbol. Thus, the control information for HARQ is transmitted with higher reliability than the data signal, so that the control information for ARQ is changed flexibly. Note that the base station apparatus and the terminal apparatus select either one of ARQ and HARQ and use it at the time of communication. If ARQ is selected, a dummy signal will be assigned to the control information for HARQ. This is done to avoid the change of format in signal symbol. If, on the other hand, HARQ is selected, the control information for ARQ will be omitted. This is done to suppress the drop in transmission efficiency.

FIG. 1 shows a structure of a communication system 100 according to an exemplary embodiment of the present invention. The communication system 100 includes a base station apparatus 10 and a first terminal apparatus 12a, a second terminal apparatus 12b and a third terminal apparatus 12c, which are generically referred to as "terminal apparatus 12".

One end of the base station apparatus 10 connects to the terminal apparatus 12 via a radio network, whereas the other end thereof connects to a wired network (not shown). The terminal apparatus 12 is connected to the base station apparatus 10 via the radio network. The base station apparatus 10 performs wireless communication with a plurality of terminal apparatuses 12 by allocating communication channels thereto. More specifically, the base station apparatus 10 broadcasts beacon, and the terminal apparatuses 12 recognize the presence of the base station apparatus 10 by receiving the beacon. Then the terminal apparatus 12 transmits to the base station apparatus 10 a request signal requesting a channel allocation. In response to a received request signal, the base station apparatus 10 allocates a communication channel to the terminal apparatus 12.

Also, the base station apparatus 10 transmits information on the communication channel allocated to the terminal apparatus 12, and the terminal apparatus 12 executes communication with the base station apparatus 10 using the allocated communication channel. As a result, the data transmitted from the terminal apparatus 12 are outputted to the wired network via the base station apparatus 10 and are finally received by a not-shown communication apparatus via the wired network. The data are also transmitted toward the terminal apparatus 12 from the communication apparatus. Though a single base station apparatus 10 is shown in FIG. 1, the communication system 100 may include a plurality of base station apparatuses 10 and the terminal apparatuses 12 can execute communication as long as communication channels are allocated by any of the base station apparatuses 10.

In the aforementioned explanation, a communication channel is identified by the combination of the sub-channel and the time slot. Since the base station apparatus 10 has a plurality of time slots and a plurality of sub-channels, the base station apparatus 10 executes OFDMA using a plurality of sub-channels while executing TDMA using a plurality of time slots.

Figure 2A:
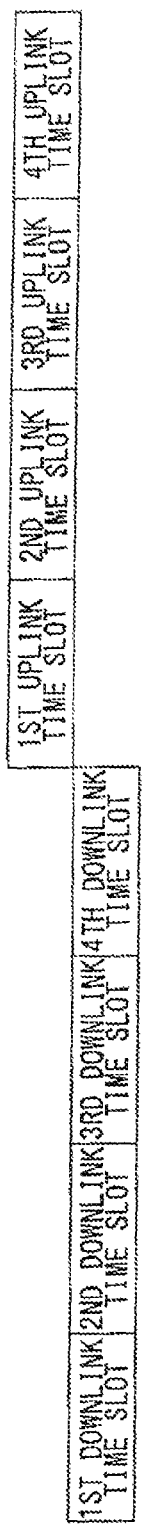
FIG. 2A shows a structure of a frame in the communication system of FIG. 1.
Figure 2B:
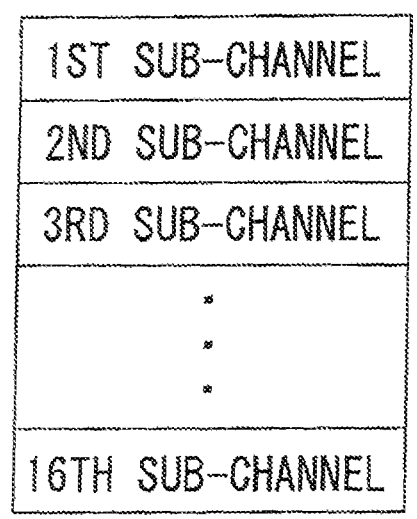
FIG. 2B shows a structure of a frame in the communication system of FIG. 1.
Figure 2C:
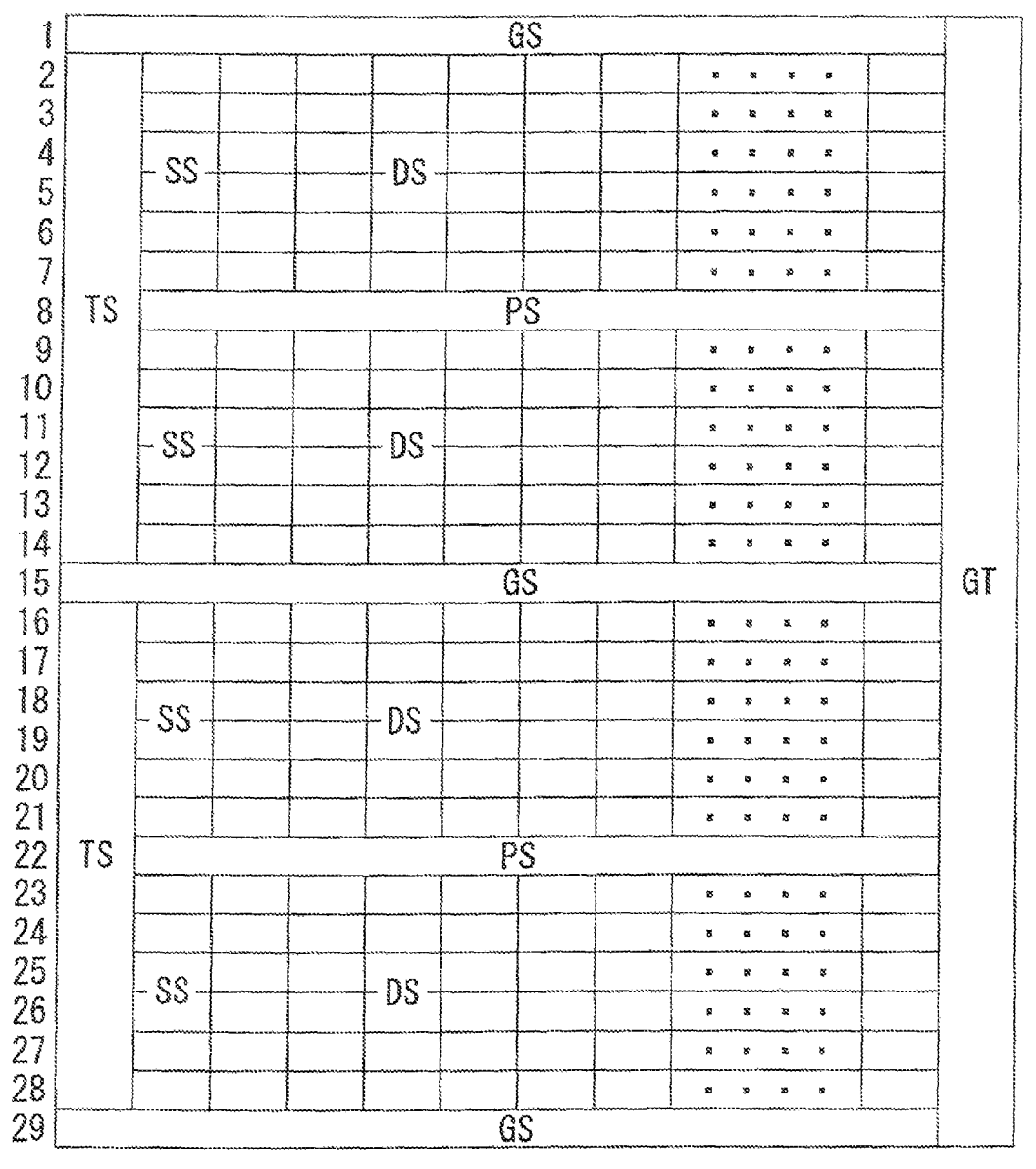

FIGS. 2A to 2C each shows a structure of a frame in the communication system 100. The horizontal direction in each of FIGS. 2A to 2C corresponds to time. A frame is constituted by eight time slots which are time-multiplexed. The eight time slots are composed of four downlink time slots and four uplink time slots. Here, the four uplink time slots are denoted as "first uplink time slot" through "fourth uplink time slot", whereas the four downlink time slots are denoted as "first downlink time slot" through "fourth downlink time slot". The frame as shown in each of FIGS. 2A to 2C is repeated contiguously.

Note that the structure of a frame is not limited to that of FIG. 2A and, for example, a frame may be constituted by four time slots or sixteen time slots. For the clarity of explanation, a description will be given hereinbelow of the structure of a frame assuming that the frame is constituted as shown in FIG. 2A. For the simplicity of explanation, the structure of an uplink time slot and that of a downlink time slot are identical to each other. Accordingly, if a description is given of the uplink time slots only or the downlink time slots only, the same description will be valid for the other time slots. A plurality of contiguous frames form a super frame wherein each of the frames is one as shown in FIG. 2A. Assume herein, for example, that a super frame is constituted by "twenty" frames.

FIG. 2B shows a structure of one of the time slots shown in FIG. 2A. The vertical direction of FIG. 2B corresponds to the frequency axis. As shown in FIG. 2B, one time slot is formed by frequency-multiplexing "16" sub-channels of "first sub-channel" through "sixteenth sub-channel". Such a plurality of sub-channels as these are frequency-division multiplexed. Since each time slot is constituted as shown in FIG. 2B, the aforementioned communication channel is identified by the combination of a time slot and a sub-channel. Also, a frame construction corresponding to one of the sub-channels shown in FIG. 2B may be one shown in FIG. 2A. Note that the number of sub-channels assigned to each time slot may not be "16". Assume here that the allocation of sub-channels in the uplink time slots and the allocation of sub-channels in the downlink time slots are identical to each other. Assume also that at least one broadcast signal (beacon) is assigned to each super frame. For example, beacon is assigned to a sub-channel in a time slot among a plurality of downlink time slots contained in a super frame.

FIG. 2C shows a structure of one of the sub-channels shown in FIG. 2B. FIG. 2C corresponds to the aforementioned packet signal. Similar to FIGS. 2A and 2B, the horizontal direction thereof corresponds to the time axis, whereas the vertical direction thereof corresponds to the frequency axis. The numbers "1" to "29" are given along the frequency axis. These numbers indicate subcarrier numbers. In this manner, a sub-channel is constituted by a multicarrier signal, in particular, an OFDM signal. "TS" in FIG. 2C corresponds to a training signal, which is constituted by a known value. "SS" corresponds to a symbol signal. "GS" corresponds to a guard symbol and no substantial signal is assigned here. "PS" corresponds to a pilot symbol, which is constituted by a known value. "DS" corresponds to a data symbol, which is data to be transmitted. "GT" corresponds to a guard time and no substantial signal is assigned here.

Figure 3:
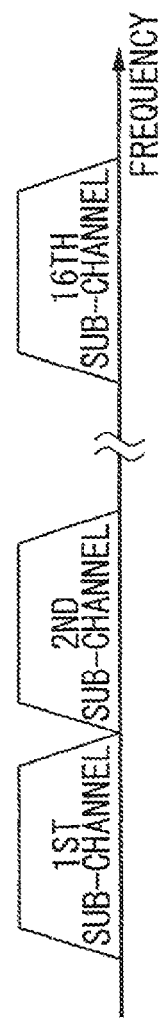
FIG. 3 shows an assignment of sub-channels in the communication system of FIG. 1.

FIG. 3 shows an assignment of sub-channels in the communication system 100. In FIG. 3, the horizontal axis represents the frequency axis and illustrates the spectrum for time slots shown in FIG. 2B. As described above, sixteen sub-channels composed of the first sub-channel to the sixteenth sub-channel are frequency-division multiplexed in each time slot. Each sub-channel is constituted by a multicarrier signal, namely, an OFDM signal here.

Figure 4:
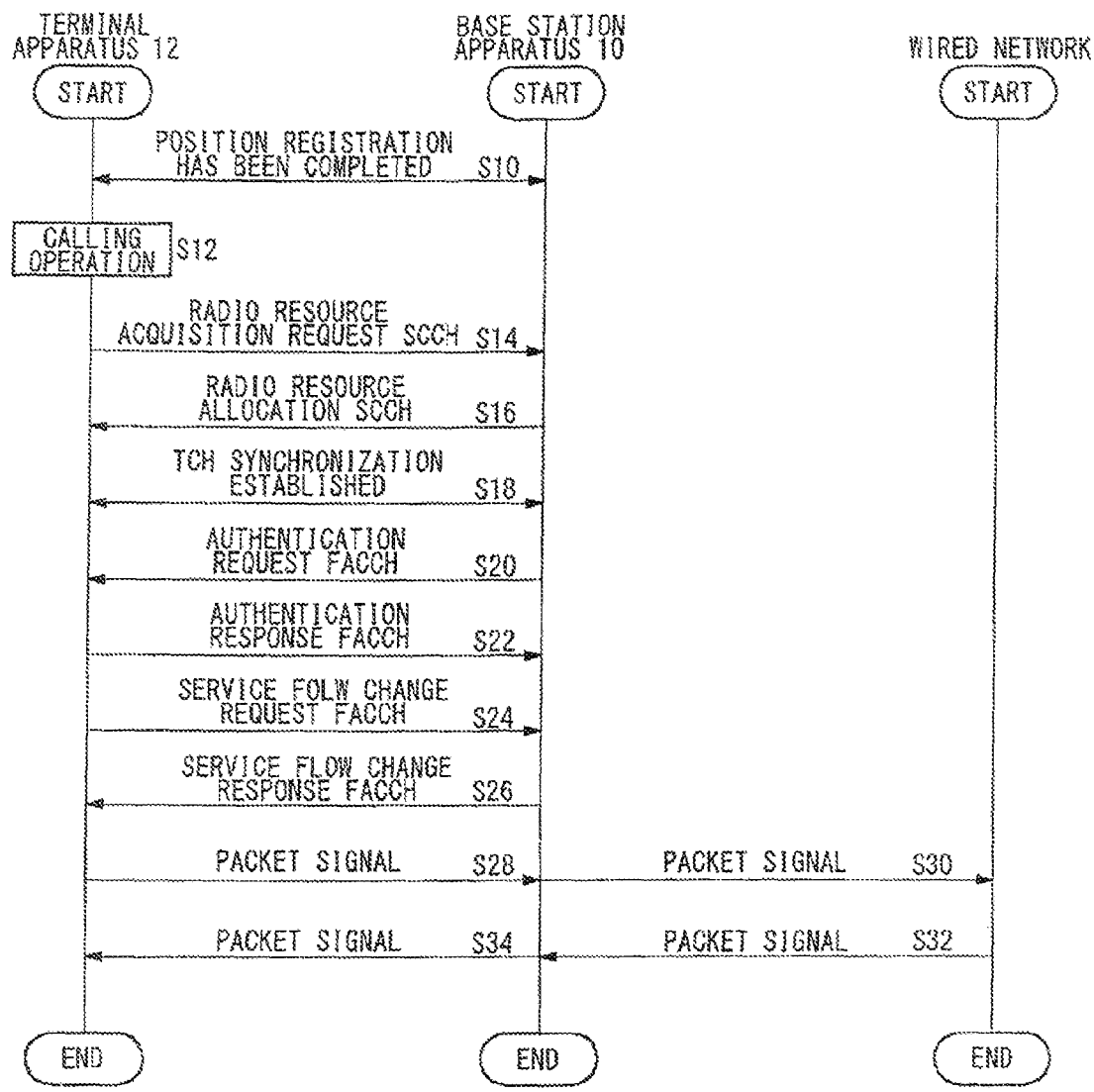
FIG. 4 is a sequence diagram showing a communication procedure in the communication system of FIG. 1.

An operation of the communication system 100 structured as above will now be described. FIG. 4 is a sequence diagram showing a communication procedure in the communication system 100. The registration of positions has been completed in between the terminal apparatus 12 and the base station apparatus 10 (S10). A user makes a call using the terminal apparatus 12 (S12). The terminal apparatus 12 transmits a radio resource acquisition request (SCCH) to the base station apparatus 10 (S14). The radio resource acquisition request SCCH contains the type of MAC protocols, the type of upper-layer protocols, and the like. The base station apparatus 10 transmits the radio resource allocation SCCH to the terminal apparatus 12 (S16). The radio resource allocation SCCH contains a slot number, an OFDMA channel number, a service flow ID, and the like. Here, the slot number corresponds to the time slot number, and the OFDMA channel number corresponds to the sub-channel number. The service flow ID is an ID allocated to identify a service flow between the base station apparatus 10 and the terminal apparatus 12, and keeps the same value during a period from the start of this service flow until the end thereof.

TCH synchronization is carried out between the terminal apparatus 12 and the base station apparatus 10 (S18). More specifically, the terminal apparatus 12 transmits a TCH idle burst to the base station apparatus 10 through an allocated sub-channel. The base station apparatus 10 determines whether the synchronization has been established or not, according to the receiving result of the TCH idle burst. The base station apparatus 10 transmits an authentication request FACCH to the terminal apparatus 12 (S20). The authentication request FACCH contains authentication random number content length, authentication random number, the type of authentication, key generation random number content length, key generation random number, and the like. The terminal apparatus 12 transmits an authentication response FACCH to the base station apparatus 10 (S22). The authentication response FACCH contains authentication operation result content length, authentication operation result, and the like. The terminal apparatus 12 transmits a service flow change request FACCH to the base station apparatus 10 (S24). The service flow change request FACCH contains a service flow ID, the type of retransmission control, ARQ control IE, HARQ control IE, and the like. Here, the type of retransmission control is specified when the presence or absence of the retransmission processing and the retransmission procedure are to be changed. Also, any one of "no ARQ", "ARQ of sequential transfer", "ARQ of random transfer" and "HARQ" is selected according to the type of retransmission control.

The ARQ control IE is information available when the type of retransmission control is ARQ of sequential transfer or ARQ of random transfer. The ARQ control IE contains, for example, each information on the ARQ window size, ARQ retransmission time-out and block survival time. The size of the ARQ window size is specified when the window size in the ARQ retransmission control is to be changed. The ARQ retransmission time-out is specified when the retransmission time of a transmitting block in the ARQ retransmission control is to be changed. The block survival time is specified when the waiting time (waiting time for the receipt of ACK) of a transmitting block in the ARQ retransmission control is to be changed. The HARQ control IE is information available when the type of retransmission control is HARQ. The HARQ control IE contains, for example, each information on an HARQ scheme, a maximum HARQ-SN and the number of retrials. The HARQ scheme specifies a scheme implemented in HARQ. The maximum HARQ-SN specifies the maximum number of HARQ sequence numbers. The number of retrials specifies the number of retrials done in HARQ.

The base station apparatus 10 transmits a service flow change response FCCH (S26). The service flow change response FACCH contains a service flow ID, a processing result, and the like. That is, the presence or absence of ARQ and the type of ARQ are specified by combining the service flow change request FACCH and the service flow change response FACCH. The terminal apparatus 12 transmits a packet signal to the base station apparatus 10 (S28), and the base station apparatus 10 transmits a packet signal to the wired network (S30). The base station apparatus 10 receives the packet signal from the wired network (S32), and the base station apparatus 10 transmits the packet signal to the terminal apparatus 12 (S34).

Figure 5:
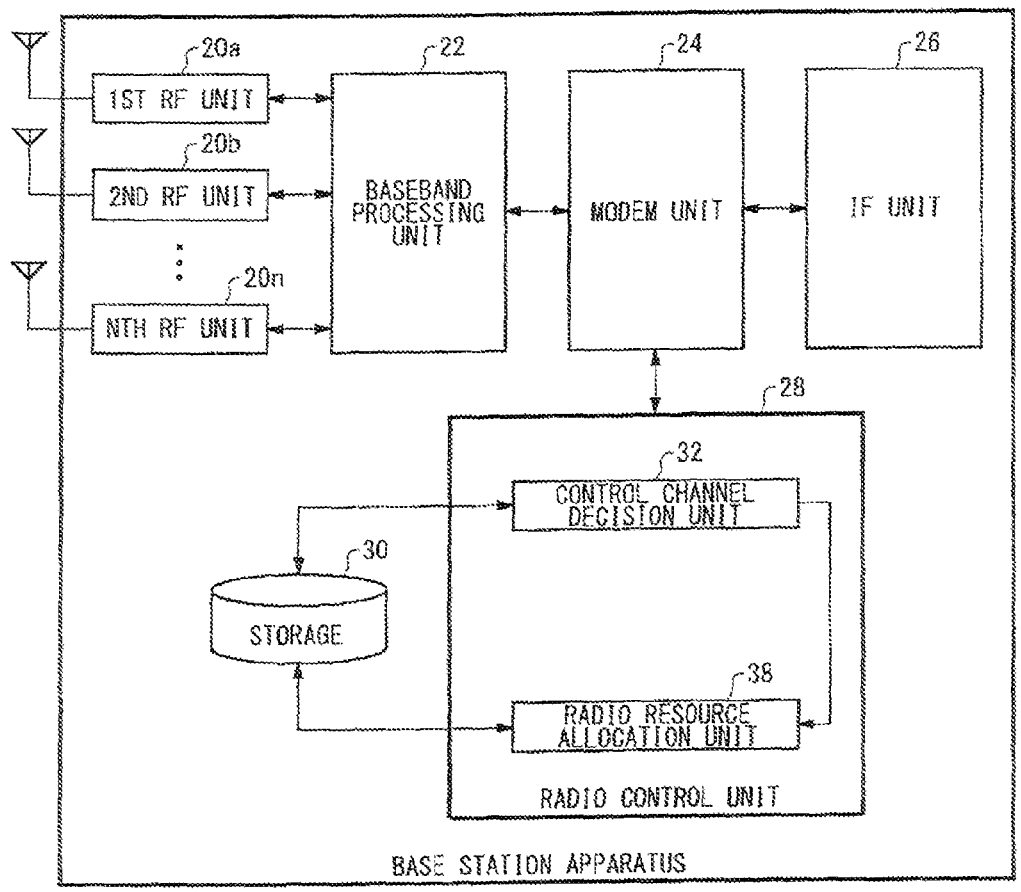
FIG. 5 shows a structure of a base station apparatus of FIG. 1.

FIG. 5 shows a structure of the base station apparatus 10. The base station apparatus 10 includes a first RF unit 20a, a second RF unit 20b, . . . and an Nth RF unit 20n, which are generically referred to as "RF unit 20", a baseband processing unit 22, a modem unit 24, an IF unit 26, a radio control unit 28, and a storage 30. The radio control unit 28 includes a control channel decision unit 32 and a radio resource allocation unit 38.

As a receiving processing, the RF unit 20 performs frequency conversion on a radiofrequency multicarrier signal received from a not-shown terminal apparatus 12 so as to produce a baseband multicarrier signal. Here, the multicarrier signal is formed as shown in FIG. 3 and corresponds to an uplink time slot as shown in FIG. 2A. Further, the RF unit 20 outputs the baseband multicarrier signal to the baseband processing unit 22. The baseband multicarrier signal, which is composed of in-phase components and quadrature components, shall generally be transmitted by two signal lines. For the clarity of Figures, the baseband multicarrier signal is presented here by a single signal line only. An AGC unit and an A-D conversion unit are also included in the RF unit 20.

As a transmission processing, the RF unit 20 performs frequency conversion on the baseband multicarrier signal inputted from the baseband processing unit 22 and thereby produces a radiofrequency multicarrier signal. Further, the RF unit 20 transmits the radiofrequency multicarrier signal. The RF unit 20 transmits the multicarrier signal using the same radio-frequency band as that of the received multicarrier signal. That is, assume that TDD (Time Division Duplex) is in use as shown in FIG. 2A. A PA (Power Amplifier) and a D-A conversion unit are also included in the RF unit 20.

As a receiving processing, the baseband processing unit 22 receives the input of baseband multicarrier signals from a plurality of RF units 20, respectively. Since the baseband multicarrier signal is a time-domain signal, the baseband processing unit 22 converts a time-domain signal into a frequency-domain signal through FFT so as to perform adaptive array signal processing on the thus converted frequency-domain signal. Also, the baseband processing unit 22 sets timing synchronization, namely FFT windows, and removes the guard intervals. A known technique may be used for the timing synchronization or the like and therefore the description thereof is omitted here. The baseband processing unit 22 outputs the results of the adaptive array signal processing to the modem unit 24. As a transmission processing, the baseband processing unit 22 receives the input of the frequency-domain multicarrier signals and perform spreading processing on them by a weight vector.

As a transmission processing, the baseband processing unit 22 converts the frequency-domain signal, which is the frequency-domain multicarrier signal inputted from the modem unit 24, into the time domain through IFFT, and outputs the thus converted time-domain signal to the RF unit 20. The baseband processing unit 22 also appends guard intervals but the description thereof is omitted here. Here, as shown in FIG. 2B, the frequency-domain signal contains a plurality of sub-channels, and each of the sub-channels contains a plurality of subcarriers as in the vertical direction shown in FIG. 2C. For the clarity of Figure, the frequency-domain signal is arranged in the order of the subcarrier numbers, and forms serial signals.

As a receiving processing, the modem unit 24 demodulates the frequency-domain multicarrier signals outputted from the baseband processing unit 22. The multicarrier signals converted into the frequency domain have components corresponding respectively to a plurality of subcarriers as shown in FIG. 2B and FIG. 2C. Demodulation is done on a subcarrier-by-subcarrier basis. The modem unit 24 outputs the demodulated signals to the IF unit 26. As a transmission processing, the modem unit 24 carries out modulation. The modem unit 24 outputs the modulated signals to the baseband processing unit 22 as frequency-domain signals.

As a receiving processing, the IF unit 26 receives a demodulation result from the modem unit 24 and separates the demodulation result in units of terminal apparatus 12. That is, the demodulation result is composed of a plurality of sub-channels, as shown in FIG. 3. Accordingly, if each sub-channel is allocated to each terminal apparatus 12, the demodulation result will contain signals from a plurality of terminal apparatuses 12. The IF unit 26 separates such a demodulation result for each terminal apparatus 12. The IF unit 26 outputs the thus separated demodulation results to the not-shown wired network. In so doing, the IF unit 26 executes transmission according to information, with which to identify the destination, such as IP (Internet Protocol) address.

As a transmission processing, the IF unit 26 inputs data for a plurality of terminal apparatuses 12, from the not-shown wired network 14. The IF unit 26 allocates data to sub-channels and forms multicarrier signals from a plurality of sub-channels. That is, as shown in FIG. 3, the IF unit 26 forms the multicarrier signal composed of a plurality of sub-channels. Assume herein that the sub-channels to which data are to be allocated are determined beforehand as in FIG. 2C and the instructions as to the allocation are received from the radio control unit 28. The IF unit 26 outputs the multicarrier signals to the modem unit 24.

The radio control unit 28 controls the operation of the base station apparatus 10. As shown in FIGS. 2A to 2C and FIG. 3, the radio control unit 28 defines time slots formed by the frequency multiplexing of a plurality of sub-channels and defines frames formed by the time multiplexing of a plurality of time slots. The radio control unit 28 instructs the modem unit 24 and the like to form the packet signals, and performs retransmission control. Here, the functions of the radio control unit 28 is described in the following order. Firstly, a description is given of (1) the allocation of communication channels by the radio resource allocation unit 38 and a control channel decision unit 32. Then, a description is given of (2) retransmission control in a situation where the communication channels have been allocated. Then, a description is given of (3) a structure of packet signal that contains control information required for the retransmission control.

(1) Allocation of Communication Channels

The radio control unit 28 broadcasts beacon from the modem unit 24 via the RF unit 20. Here, the beacon contains information, such as its identification number and unused sub-channel numbers, and the like. Note that the beacon is allocated to a sub-channel determined by the control channel decision unit 32 (described later). The radio resource allocation unit 38 receives a sub-channel allocation request sent from the not-shown terminal apparatus 12, from the RF unit 20 via the modem unit 24. The sub-channel allocation request is equivalent to the aforementioned radio resource acquisition request SCCH.

The radio resource allocation unit 38 allocates a sub-channel to the terminal apparatus that has received the allocation request. Here, the radio resource allocation unit 38 allocates sub-channels contained in the uplink time slots and the downlink time slots, to the terminal apparatus 12. In particular, assume that the allocation of sub-channels in the uplink time slots and the allocation of sub-channels in the downlink time slots are symmetrical to each other. When allocating the sub-channels, the radio resource allocation unit 38 references the information such as the type of MAC protocols, the type of upper-layer protocols and the like contained in the radio resource acquisition request SCCH; however, the description thereof is omitted here. The radio resource allocation unit 38 transmits an allocation notification to this terminal apparatus 12 from the modem unit 24 via the RF unit 20. The allocation notification corresponds to the aforementioned radio resource allocation SCCH. The allocation notification contains information on the allocated sub-channels and time slots. After the above-described processing has been carried out, the radio control unit 28 causes the RF unit 20 through the modem unit 24 to perform communication with the terminal apparatus 12 to which the sub-channel has been allocated.

The control channel decision unit 32 allocates beacon to sub-channels. Here, as described above, beacon is a signal that contains information used to control communication with the terminal apparatus 12. The beacon or the like signal is said to be more important than the packet signal containing the data. The control channel decision unit 32 selects a predetermined sub-channel by referencing the storage 30. The control channel decision unit 32 conveys the selected sub-channel to the radio resource allocation unit 38. The radio resource allocation unit 38 allocates the sub-channel to the beacon according to the notification from the control channel decision unit 32. In cooperation with the radio control unit 28, the storage 30 stores information on the sub-channel allocated to the terminal apparatus 12 and information on a control channel.

(2) Retransmission Control

The RF unit 20 to IF unit 26 generate the packet signal that contains the signal symbol and the data symbol, and transmit the thus generated packet signal. The radio control unit 28 defines a plurality of kinds of retransmission controls for the RF unit 20 through the IF unit 26. Such a plurality of kinds of retransmission controls are specific means used to achieve the retransmission controls. Here, the kinds of the retransmission controls are classified into ARQ and HARQ, and the radio control unit 28 has the structural components of the RF unit 20 through the IF unit 26 execute either ARQ or HARQ. ARQ is further classified into sequential transfer and random transfer. The sequential transfer includes Stop-and-Wait ARQ and Go-Back-N ARQ, and the random transfer corresponds to selective retransmission ARQ. A description is given hereinbelow in the order of Stop-and-Wait ARQ, Go-Back-N ARQ, selective retransmission ARQ and HARQ.

Figure 6:
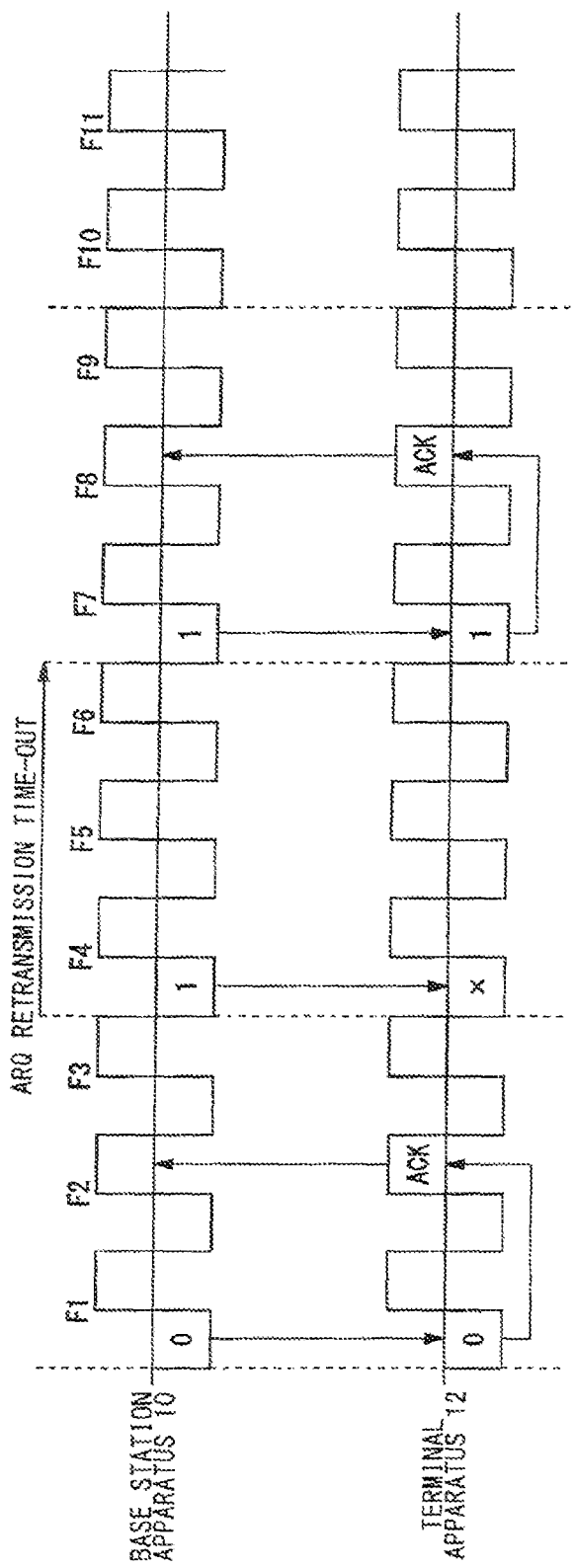
FIG. 6 shows a brief overview of Stop-and-Wait ARQ controlled by a radio control unit of FIG. 5.

First, Stop-and-Wait ARQ is a method where a transmitting side transmits the packet signal one by one. If the transmitting side does not receive ACK sent from the receiving side, the transmitting side will retransmit the same packet signal. In Stop-and-Wait ARQ, the ARQ window size is 1. A description is given here assuming that the base station apparatus 10 is the transmitting side. FIG. 6 illustrates a brief overview of Stop-and-Wait ARQ controlled by the radio control unit 28. The top row of FIG. 6 is a time chart corresponding to a transmit/receive operation of the base station apparatus 10. The bottom row of FIG. 6 is a time chart corresponding to a transmit/receive operation of the terminal apparatus 12. Assume herein that the packet signal containing data is transmitted in the downlink direction. In FIG. 6, the aforementioned frames are indicated as "F1" to "F11". Though each time slot in each frame is used in order for the base station apparatus 10 to transmit the packet signal to the terminal apparatus 12, no distinction is made here between the time slots and thus the frame is simply indicated as frame F.

Suppose here that the period for the ARQ retransmission time-out is 3 frames. The base station apparatus 10 transmits the packet signal to which a sequence number is appended. Though the detail will be discussed later, each packet signal contains each PDU to which the sequence number is appended. The base station apparatus 10 does not transmit the next PDU until it receives ACK of the PDU transmitted. The base station apparatus 10 assigns the sequence numbers in order starting from "0". In FIG. 6, the base station apparatus 10 transmits a PDU of sequence number "0" using F1, and the terminal apparatus 12 receives this PDU. In F2, the terminal apparatus 12 transmits ACK for the PDU received, and the base station apparatus 10 receives this ACK. Here, when the base station apparatus 10 succeeds in receiving the ACK, it is regarded that PDUs prior to the sequence number corresponding to the received ACK have been transmitted normally. Then, in F4, the base station apparatus 10 transmits a PDU of sequence number "1". Since this PDU is not received by the terminal apparatus 12, ACK for this PDU is not transmitted from the terminal apparatus 12. As a result, ARQ retransmission time-out occurs in F6. At that time, the base station apparatus 10 retransmits the PDU of sequence number "1" using F7. When a block survival period has elapsed after the PDU, whose ACK is not received, has been first transmitted, the base station apparatus 10 discards said PDU and transmits the next PDU.

To enable ARQ, the base station apparatus 10 appends a sequence number to an SN field of MAC header (described later) at the time of transmitting the PDU. The sequence numbers are managed for each service flow, and those used for one service flow will not affect those used for the other services. To transmit ACK in ARQ for the received data, the terminal apparatus 12 uses the uplink time slots which are paired with the downlink time slots. The terminal apparatus 12 stores the sequence numbers, which have been received normally, in an ACK SN-field within the MAC header as ACK of ARQ.

Figure 7:
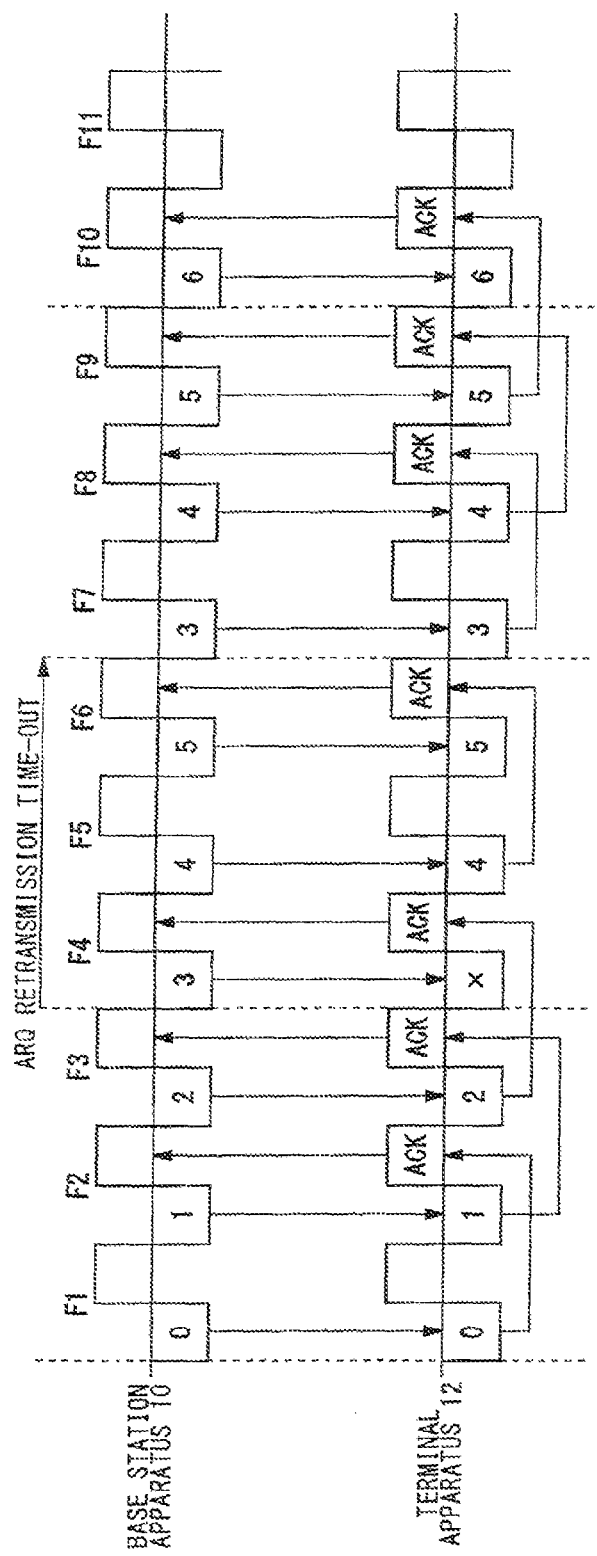
FIG. 7 shows a brief overview of GO-Back-N ARQ controlled by the radio control unit of FIG. 5.

Go-Back-N ARQ is a method where the transmitting side transmits PDUs continuously. If the transmitting side does not receive ACK sent from the receiving side, the transmitting side will retransmit the packet signals including the packet signal to be associated with said ACK and the subsequent packet signals. FIG. 7 illustrates a brief overview of GO-Back-N ARQ controlled by the radio control unit 28. Suppose here that the ARQ window size is 3 and the period for the ARQ retransmission time-out is 3 frames. Similar to FIG. 6, the base station apparatus 10 transmits the packet signal to which a sequence number is appended. Even if ACK of the PDU transmitted is not received but as long as data is within the ARQ window size, the base station apparatus 10 will transmit the next PDU continuously. The base station apparatus 10 assigns the sequence numbers in order starting from "0". In FIG. 7, the base station apparatus 10 transmits a PDU of sequence number "0" using F1, and the terminal apparatus 12 receives this PDU. In F2, the base station apparatus 10 transmits a PDU whose sequence number is "1" even if ACK for the PDU of sequence number "0" is not received. In F3, too, the base station apparatus 10 transmits a PDU whose sequence number is "2" in a similar manner.

On the other hand, the terminal apparatus 12 receives the PDUs whose sequence numbers are "0" to "2" in F1 to F3 and transmits ACK for each of the PDUs in F2 and F4. Here, when the base station apparatus 10 succeeds in receiving the ACKs, it is regarded that PDUs prior to the sequence numbers corresponding to the received ACKs have been transmitted normally. Then, in F4, the base station apparatus 10 transmits a PDU of sequence number "3". Since this PDU is not received by the terminal apparatus 12, ACK for this PDU is not transmitted from the terminal apparatus 12. Nevertheless, the base station apparatus 10 transmits PDUs of sequence numbers "4" and "5" in F5 and F6. In F6, an ARQ retransmission time-out occurs. At that time, the base station apparatus 10 retransmits a PDU of sequence number "3" in F7. That is, when an ARQ retransmission time-out occurs, the base station apparatus 10 retransmits all PDUs which have been transmitted after the PDU whose ACK is not received. Further, the base station apparatus 10 and the terminal apparatus 12 repeat the similar processing. When a block survival period has elapsed after the PDU, whose ACK is not received, has been first transmitted, the base station apparatus 10 discards said PDU and transmits the next PDU.

Figure 8:
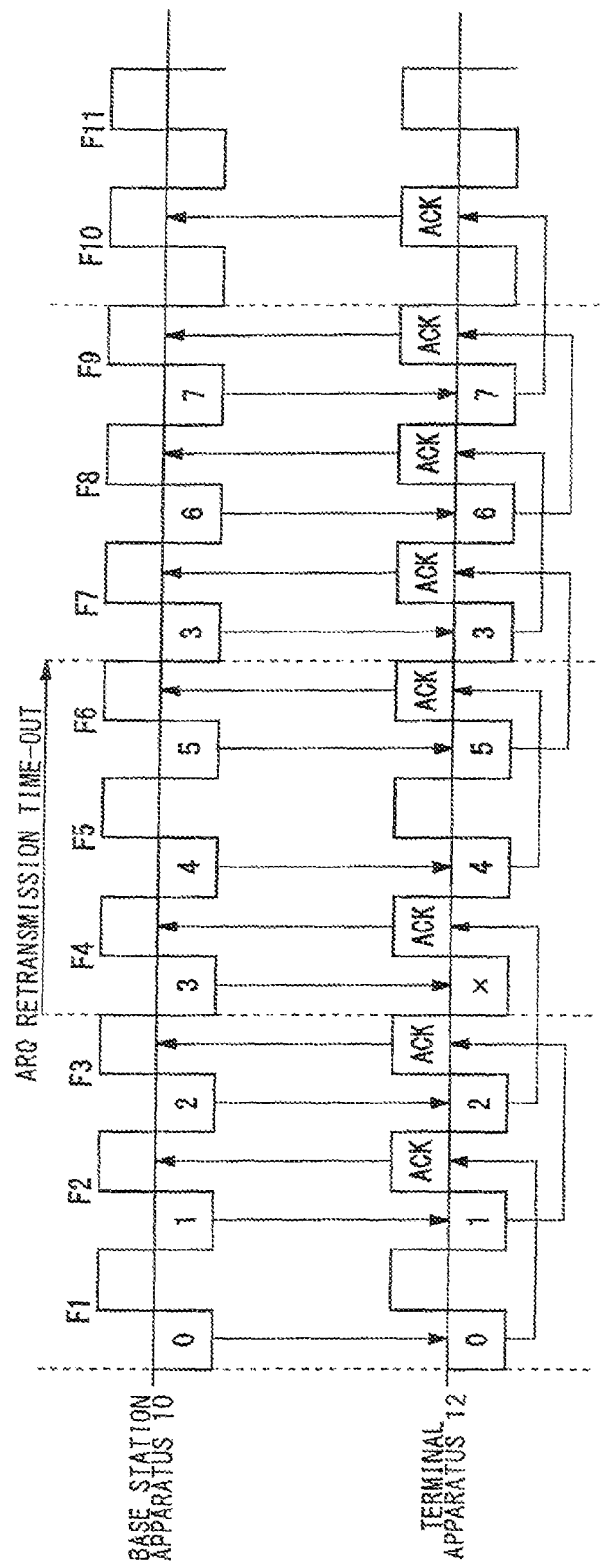
FIG. 8 shows a brief overview of selective ARQ controlled by the radio control unit of FIG. 5.

Selective retransmission ARQ is a method where the transmitting side transmits PDUs continuously. If the transmitting side does not receive ACK sent from the receiving side, the transmitting side will retransmit the packet signal corresponding to said ACK. FIG. 8 illustrates a brief overview of selective retransmission ARQ controlled by the radio control unit 28. Suppose here that the ARQ window size is 3 and the period for the ARQ retransmission time-out is 3 frames. Similar to FIG. 6, the base station apparatus 10 transmits the packet signal to which a sequence number is appended. Even if ACK of the PDU transmitted is not received but as long as data is within the PDU window size, the base station apparatus 10 will transmit the next PDU continuously. The base station apparatus 10 assigns the sequence numbers in order starting from "0". In FIG. 8, the base station apparatus 10 transmits a PDU of sequence number "0" using F1, and the terminal apparatus 12 receives this PDU. In F2, the base station apparatus 10 transmits a PDU whose sequence number is "1" even if ACK for the PDU of sequence number "0" is not received. In F3, too, the base station apparatus 10 transmits a PDU whose sequence number is "2" in a similar manner.

On the other hand, the terminal apparatus 12 receives the PDUs whose sequence numbers are "0" to "2" in F1 to F3 and transmits ACK for each of the PDUs in F2 and F4. Here, when the base station apparatus 10 succeeds in receiving the ACKs, it is regarded that PDUs of the sequence numbers corresponding to the received ACKs have been transmitted normally. Then, in F4, the base station apparatus 10 transmits a PDU of sequence number "3". Since this PDU is not received by the terminal apparatus 12, ACK for this PDU is not transmitted from the terminal apparatus 12. Nevertheless, the base station apparatus 10 transmits the sequence numbers "4" and "5" in F5 and F6. In F6, an ARQ retransmission time-out for the PDU of sequence number "3" occurs. At that time, the base station apparatus 10 retransmits the sequence number "3" in F7. That is, when an ARQ retransmission time-out occurs, the base station apparatus 10 retransmits the PDU whose ACK is not received. Further, the base station apparatus 10 and the terminal apparatus 12 repeat the similar processing. When a block survival period has elapsed after the PDU, whose ACK is not received, has been first transmitted, the base station apparatus 10 discards said PDD and transmits the next PDU.

HARQ is a retransmission method where the packet error correction rate is improved by combining a retransmission control with FEC. Here, IR (Incremental Redundancy) HARQ is used as HARQ. IR-HARQ is a method for improving the error correction rate by the use of punctured patterns. If error correction fails, the transmitting side will transmit only the initial punctured portion of data. At that time, the amount of data to be transmitted reduces and therefore the data are transmitted using a reduced modulation scheme. The receiving side can improve the error correction rate by supplementing the puncture with the initial transmission data. Parameters are stored in signal symbols to distinguish between punctured coded data and punctured pattern data and between ACK and NACK.

FIGS. 9A to 9I illustrate a brief overview of HARQ controlled by the radio control unit 28 of FIG. 5. FIG. 9A shows user data transmitted initially from the base station apparatus 10. Given here are user data "A0" to "A8". FIG. 9B shows a result of FEC coding. Here, the convolutional coding with the coding rate of 1/2 is performed and, as a result, coded data of "X0" and "Y0" to "X8" and "Y8" are generated. FIG. 9C shows a result obtained when punctured coding is performed on the coded data of FIG. 9B. FIG. 9D shows data transmitted from the base station apparatus 10. As shown in FIG. 9D, the punctured coded results are arranged serially. FIG. 9E shows a result obtained when punctured decoding is performed on a result received by the terminal apparatus 12. Here, if the result of punctured decoding performed thereon contains no error, the terminal apparatus 12 will reproduce the user data by executing Viterbi decoding. If, on the other hand, the result of punctured decoding performed thereon contains any error, the terminal apparatus 12 will transmit NACK to the base station apparatus 10.

FIG. 9F shows the punctured portions of data in the punctured pattern of FIG. 9C. When the base station apparatus 10 receives NACK sent from the terminal apparatus 12, the base station apparatus 10 extracts the punctured portions of data. FIG. 9G shows transmitted data when retransmitted from the base station apparatus 10. The punctured portions of data shown in FIG. 9F are shown in FIG. 9G. FIG. 9H shows the punctured portions of data received by the terminal apparatus 12. FIG. 9I shows a result where the puncture has been interpolated using an IR method. The terminal apparatus 12 decodes the data which are the result shown in FIG. 9I, and reproduces the user data. If the base station apparatus 10 receives NACK after sending the punctured patterns, the base station apparatus 10 will retransmit the punctured coded PDUs. If neither NACK nor ACK can be received from the terminal apparatus 12, the base station apparatus 10 will retransmit the punctured coded PDUs.

When executing HARQ, the base station apparatus 10 appends the sequence numbers similarly to when executing ARQ. However, the sequence numbers in HARQ are not contained in the MAC header but contained in the data symbols. When transmitting HARQ-ACK for the received data, the terminal apparatus 12 uses an uplink time slot which is paired with the downlink time slot.

(3) Structure of Packet Signal

FIGS. 10A to 10D show a structure of signal symbols generated by the radio control unit 28 of FIG. 5. Here, FIG. 10A corresponds to uplink signal symbols, whereas FIG. 10B corresponds to downlink signal symbols. Accordingly, the symbols as shown in FIG. 10A are generated by the terminal apparatus 12. MI indicates a modulation parameter notification, and MR indicates a modulation parameter request. PC indicates a transmit power control request, and TC indicates a time alignment control request. HC is set by a transmitting side when HARQ retransmission control is performed, and HA is responded by a receiving side when HARQ retransmission control is performed. ED is used to detect the error in the signal symbols.

FIG. 10C shows a structure of HC field. As shown in FIG. 10C, HC is 4-bit data and contains "with/without retransmission", "type of puncture", and "HARQ SN". "With/without retransmission" indicates whether HARQ retransmission is to be carried out or not. "Type of puncture" indicates the puncture type of transmit data, and indicates punctured coded data or punctured data. HARQ SN indicates the sequence number of HARQ. FIG. 10D shows a structure of HA field. As shown in FIG. 10D, HA is 4-bit data and contains "with/without ACK", "type of ACK", and "HARQ ACK SN". "With/without ACK" indicates whether there is an HARQ-ACK or not. "Type of ACK" indicates the type of HARQ ACK, and indicates ACK or NACK. "HARQ ACK SN" indicates the sequence number of HARQ ACK.

Figure 11A:
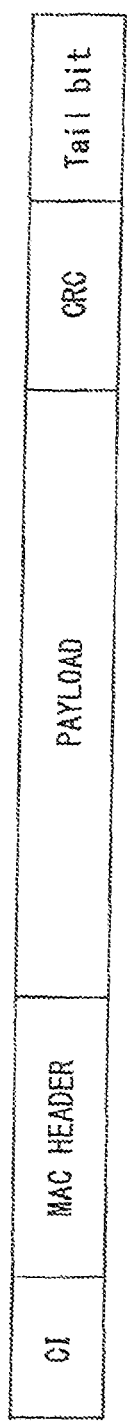
FIGS. 11A and 11B show a structure of data symbols generated by the radio control unit of FIG. 5.
Figure 11B:
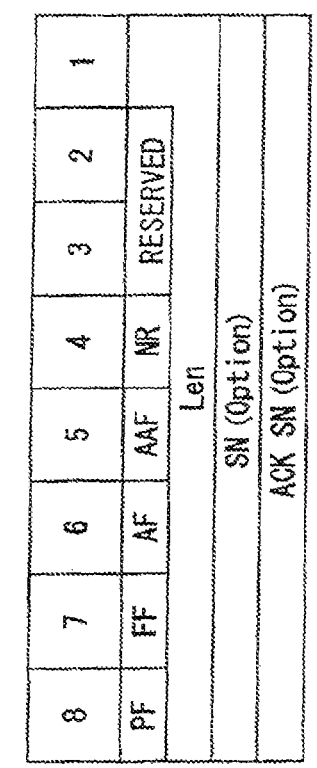

FIGS. 11A and 11B show a structure of data symbols generated by the radio control unit 28 of FIG. 5. In FIG. 11A, a CI bit used to identify the type of channel is set in the beginning of data symbols. Following the CI, a MAC header and a payload are assigned. Note that a combination of MAC header and payload corresponds to the aforementioned PDU. A 16-bit CRC and a tail bit are set in a posterior part of the data symbols. Here, the tail bit is the appended bit data required for the decoding in error correction. Note that data symbols are modulated using a modulation scheme specified by MI of the signal symbol.

FIG. 11B shows a structure of MAC header. "PF" is a flag indicating the packing state of payload. Though the packing is to aggregate a plurality of data into a payload, the description thereof is omitted here. When PF is 0, data in the payload are not packed; and when PF is 1, the data in the payload is packed. "FF" is a flag indicating the fragmented state of payload. The fragmenting is a processing that divides data when the data whose size is larger than that of the payload are to be transmitted. The detailed description of fragmenting processing is omitted here. When FF is 0, the data in the payload is not fragmented; and when FF is 1, the data in the payload is fragmented.

"AF" is a flag indicating whether an SN field for ARQ is valid or invalid. If valid, an SN field exists in the MAC header. "AAF" is a flag indicating whether an ACK SN field for ARQ ACK is valid or invalid. If valid, an ACK SN field exists in the MAC header. "NR" is a flag that cannot be ARQ-received and is used when the receiving side conveys the stop/restart of retransmission control to the transmitting side. "Len" indicates the length of data area in a frame format within a single sub-channel, in units of byte. "SN" is a sequence number and indicates a value incremented per service flow (mod 256). "SN" is an optional field available only when AF is valid. "ACK SN" is a field used to store the results of ARQ, and indicates the sequence number of ARQ ACK. "ACK SN" is a value incremented per PDU (mod 256), and indicates a sequence number that has been received normally. Note that "SN" is an optional field available only when AF is valid.

The structure of the above-described packet signal is summarized as follows. The radio control unit 28 has the control information for HARQ, namely "HC" and "HA", contained in the signal symbol and it has the control information for ARQ, namely "SN" and "ACK SN" contained in the MAC header within the data symbol. As evident from FIGS. 10A to 10C and FIG. 11B, the size of control information for HARQ is 8 bits, whereas the size of control information for ARQ is 16 bits. In other words, the former is less than the latter. The sequence number for HARQ is of 2 bits, whereas the sequence number for ARQ is of 8 bits. As the sequence number becomes larger, the ARQ window size can be made larger. Accordingly, the ARQ window size of HARQ is so defined as to be smaller than ARQ window size of ARQ.

In this manner, the control information for HARQ which is smaller in size is assigned to the signal symbol. Thus, the reliability of the control information for HARQ is improved. On the other hand, the control information for ARQ which is larger in size is assigned to the MAC header. Thus, increase in the data amount of signal symbols can be suppressed. In particular, the signal symbol is formed of an OFDM signal and therefore the signal symbol increases in units of OFDM symbol. As a result, the transmission efficiency deteriorates gradually as the number of signal symbols increases. Thus it is desirable that the size of control information to be contained in the signal symbol be smaller.

When executing HARQ, the radio control unit 28 skips a step of having the control information for ARQ contained in the MAC header. On the other hand, when executing ARQ, the radio control unit 28 uses dummy information as the control information for HARQ. In other words, since the size of control information for ARQ is larger than that of control information for HARQ, the control information for ARQ is deleted when it is not used. As a result, the deterioration of transmission efficiency is suppressed. Also, since the size of control information for HARQ is smaller than that of control information for ARQ and the format of signal symbols is kept intact, the control information for HARQ is not deleted even when it is not used.

This structure may be implemented hardwarewise by elements such as a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

Figure 12:
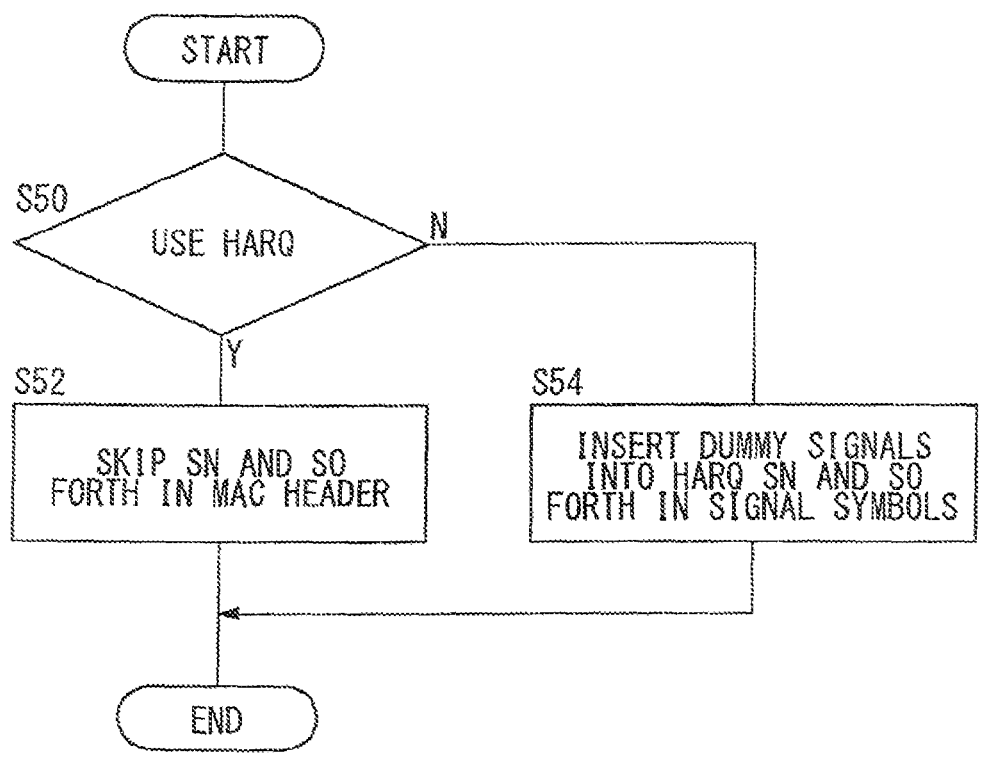
FIG. 12 is a flowchart showing a processing procedure of retransmission control in the radio control unit of FIG. 5.

An operation of the base station apparatus 10 implementing the above-described structure will be described now. FIG. 12 is a flowchart showing a processing procedure of retransmission control in the radio control unit 28. When HARQ is used (Y of S50), the radio control unit 28 omits SN and the like in the MAC header (S52). On the other hand, when HARQ is not used (N of S50), namely when ARQ is used, dummy signals are inserted into HARQ SN and the like in the signal symbols.

According to the present exemplary embodiment, a plurality of pieces of control information corresponding respectively to different retransmission controls are assigned to another areas of the packet signal, so that the increase in the size of particular parts can be suppressed. Also, the control signal is assigned to both the signal symbols and the data symbols, so that the control information can be transmitted even if the size of the control information increases. Also, since the control signal for HARQ is assigned to the signal symbols, the transmission quality of control signal for HARQ can be improved. Further, since the control information for ARQ is assigned to the data symbols, the change in the format of control information for ARQ can be flexibly dealt with.

Also, since the size of control information for HARQ is smaller than that of control signal for ARQ, the increase in the size of signal symbols can be suppressed. Also, when HARQ is executed, the step of having the control information for ARQ contained in the MAC header is skipped. Thus, the deterioration in transmission efficiency can be suppressed. Also, when ARQ is executed, the dummy information is contained in the control information for HARQ, so that the format of signal symbols can be kept intact.

In a modification of the present exemplary embodiment, a data symbol contains a payload, and data is assigned to the payload. As described above, there are a plurality of kinds of data, and the quality required for each data information generally differs. Though there are various items for the required quality, the real-timeliness is taken into consideration here for clarity of explanation. One of factors used to identify the real-timeliness is the presence or absence of retransmission control. Also, the type of retransmission control determines the real-timeliness. Thus, the presence or absence of retransmission control and the type of retransmission control are defined according to the real-timeliness required for each data information.

There are cases where the size of data to be transmitted is smaller than the size of payload. To improve the transmission efficiency of the communication system, it is preferable that the size of data contained in each payload is as large as possible. For this reason, it is effective to assign a plurality of data to a single payload from the viewpoint of the transmission efficiency of the communication system. Hereinafter, assigning a plurality of data to a single payload will be called "packing" In so doing, if retransmission control is performed on the payloads as a whole, the retransmission control can be achieved in a simplified manner even when the packing is executed. However, if the packing is performed on a plurality of data each of which has different real-timeliness, the real-timeliness required for given data may be met but that for another data may not be met. As a result, the real-timeliness required for the communication system as a whole will not be satisfied. In order to cope with this, the communication system according to the present exemplary embodiment executes the following processing.

When retransmission control is not performed on each of a plurality of data or when the type of retransmission control for each of the plurality of data is identical to each other, the base station apparatus determines the execution of packing. Note that there is a control signal to be assigned to a payload, separately from the aforementioned signal symbol. This control signal may be said to be control information of upper layer than the signal symbol, and the execution of retransmission control is defined in the control signal. When performing retransmission control on the data, the base station apparatus determines the execution of packing to said data and the control signal, irrespective of the types of retransmission controls of data and control signal. Note that if the types of retransmission controls for both said data and the control signal differ, the type of retransmission control for the control signal will be changed to suit the type of retransmission control for data.

FIG. 5 shows a structure of the base station apparatus 10. The base station apparatus 10 includes a first RF unit 20a, a second RF unit 20b, ... and an Nth RF unit 20n, which are generically referred to as "RF unit 20", a baseband processing unit 22, a modem unit 24, an IF unit 26, a radio control unit 28, and a storage 30. The radio control unit 28 includes a control channel decision unit 32 and a radio resource allocation unit 38.

As a receiving processing, the RF unit 20 performs frequency conversion on a radiofrequency multicarrier signal received from a not-shown terminal apparatus 12 so as to produce a baseband multicarrier signal. Here, the multicarrier signal is formed as shown in FIG. 3 and corresponds to an uplink time slot as shown in FIG. 2A. Further, the RF unit 20 outputs the baseband multicarrier signal to the baseband processing unit 22. The baseband multicarrier signal, which is composed of in-phase components and quadrature components, shall generally be transmitted by two signal lines. For the clarity of Figures, the baseband multicarrier signal is presented here by a single signal line only. An AGC unit and an A-D conversion unit are also included in the RF unit 20.

As a transmission processing, the RF unit 20 performs frequency conversion on the baseband multicarrier signal inputted from the baseband processing unit 22 and thereby produces a radiofrequency multicarrier signal. Further, the RF unit 20 transmits the radiofrequency multicarrier signal. The RF unit 20 transmits the multicarrier signal using the same radio-frequency band as that of the received multicarrier signal. That is, assume that TDD (Time Division Duplex) is in use as shown in FIG. 2A. A PA (Power Amplifier) and a D-A conversion unit are also included in the RF unit 20.

As a receiving processing, the baseband processing unit 22 receives the input of baseband multicarrier signals from a plurality of RF units 20, respectively. Since the baseband multicarrier signal is a time-domain signal, the baseband processing unit 22 converts a time-domain signal into a frequency-domain signal through FFT so as to perform adaptive array signal processing on the thus converted frequency-domain signals. Also, the baseband processing unit 22 sets timing synchronization, namely FFT windows, and removes the guard intervals. A known technique may be used for the timing synchronization or the like and therefore the description thereof is omitted here. The baseband processing unit 22 outputs the results of the adaptive array signal processing to the modem unit 24. As a transmission processing, the baseband processing unit 22 receives the input of the frequency-domain multicarrier signals and perform spreading processing on them by a weight vector.

As a transmission processing, the baseband processing unit 22 converts the frequency-domain signal, which is the frequency-domain multicarrier signal inputted from the modem unit 24, into the time domain through IFFT, and outputs the thus converted time-domain signal to the RF unit 20. The baseband processing unit 22 also appends guard intervals but the description thereof is omitted here. Here, as shown in FIG. 2B, the frequency-domain signal contains a plurality of sub-channels, and each of the sub-channels contains a plurality of subcarriers as in the vertical direction shown in FIG. 2C. For the clarity of Figure, the frequency-domain signal is arranged in the order of the subcarrier numbers, and forms serial signals.

As a receiving processing, the modem unit 24 demodulates the frequency-domain multicarrier signals outputted from the baseband processing unit 22. The multicarrier signals converted into the frequency domain have components corresponding respectively to a plurality of subcarriers as shown in FIG. 2B and FIG. 2C. Demodulation is done on a subcarrier-by-subcarrier basis. The modem unit 24 outputs the demodulated signals to the IF unit 26. As a transmission processing, the modem unit 24 carries out modulation. The modem unit 24 outputs the modulated signals to the baseband processing unit 22 as frequency-domain signals.

As a receiving processing, the IF unit 26 receives a demodulation result from the modem unit 24 and separates the demodulation result in units of terminal apparatus 12. That is, the demodulation result is composed of a plurality of sub-channels, as shown in FIG. 3. Accordingly, if each sub-channel is allocated to each terminal apparatus 12, the demodulation result will contain signals from a plurality of terminal apparatuses 12. The IF unit 26 separates such a demodulation result for each terminal apparatus 12. The IF unit 26 outputs the thus separated demodulation results to the not-shown wired network. In so doing, the IF unit 26 executes transmission according to information, with which to identify the destination, such as IP (Internet Protocol) address.

As a transmission processing, the IF unit 26 inputs data for a plurality of terminal apparatuses 12, from the not-shown wired network 14. The IF unit 26 allocates data to sub-channels and forms multicarrier signals from a plurality of sub-channels. That is, as shown in FIG. 3, the IF unit 26 forms the multicarrier signal composed of a plurality of sub-channels. Assume herein that the sub-channels to which data are to be allocated are determined beforehand as in FIG. 2C and the instructions as to the allocation are received from the radio control unit 28. The IF unit 26 outputs the multicarrier signals to the modem unit 24.

The radio control unit 28 controls the operation of the base station apparatus 10. As shown in FIGS. 2A to 2C and FIG. 3, the radio control unit 28 defines time slots formed by the frequency multiplexing of a plurality of sub-channels and defines frames formed by the time multiplexing of a plurality of time slots. The radio control unit 28 instructs the modem unit 24 and the like to form the packet signals, and performs retransmission control. Here, the functions of the radio control unit 28 is described in the following order. Firstly, a description is given of (1) the allocation of communication channels by the radio resource allocation unit 38 and a control channel decision unit 32. Then, a description is given of (2) retransmission control in a situation where the communication channels have been allocated. Then, a description is given of (3) a structure of packet signal that contains control information required for the retransmission control. Then, a description is given of (4) the packing processing executed in consideration of the retransmission control and the structure of packet signal.

(1) Allocation of Communication Channels

The radio control unit 28 broadcasts beacon from the modem unit 24 via the RF unit 20. Here, the beacon contains information, such as its identification number and unused sub-channel numbers, and the like. Note that the beacon is allocated to a sub-channel determined by the control channel decision unit 32 (described later). The radio resource allocation unit 38 receives a sub-channel allocation request sent from the not-shown terminal apparatus 12, from the RF unit 20 via the modem unit 24. The sub-channel allocation request is equivalent to the aforementioned radio resource acquisition request SCCH.

The radio resource allocation unit 38 allocates a sub-channel to the terminal apparatus that has received the allocation request. Here, the radio resource allocation unit 38 allocates sub-channels contained in the uplink time slots and the downlink time slots, to the terminal apparatus 12. In particular, assume that the allocation of sub-channels in the uplink time slots and the allocation of sub-channels in the downlink time slots are symmetrical to each other. When allocating the sub-channels, the radio resource allocation unit 38 references the information such as the type of MAC protocols, the type of upper-layer protocols and the like contained in the radio resource acquisition request SCCH; however, the description thereof is omitted here. The radio resource allocation unit 38 transmits an allocation notification to this terminal apparatus 12 from the modem unit 24 via the RF unit 20. The allocation notification corresponds to the aforementioned radio resource allocation SCCH. The allocation notification contains information on the allocated sub-channel and time slots. After the above-described processing has been carried out, the radio control unit 28 causes the RF unit 20 through the modem unit 24 to perform communication with the terminal apparatus 12 to which the sub-channel has been allocated.

The control channel decision unit 32 allocates beacon to sub-channels. Here, as described above, beacon is a signal that contains information used to control communication with the terminal apparatus 12. The beacon or the like signal is said to be more important than the packet signal containing the data. The control channel decision unit 32 selects a predetermined sub-channel by referencing the storage 30. The control channel decision unit 32 conveys the selected sub-channel to the radio resource allocation unit 38. The radio resource allocation unit 38 allocates the sub-channel to the beacon according to the notification from the control channel decision unit 32. In cooperation with the radio control unit 28, the storage 30 stores information on the sub-channel allocated to the terminal apparatus 12 and information on a control channel.

(2) Retransmission Control

The radio control unit 28 defines with/without of retransmission control and a plurality of kinds of retransmission controls for the RF unit 20 through the IF unit 26. With/without of retransmission control means whether a retransmission control is to be executed or not. Such a plurality of kinds of retransmission controls are specific means used to achieve the retransmission controls. Here, the kinds of the retransmission controls are classified into ARQ and HARQ. ARQ is classified into sequential transfer and random transfer. The sequential transfer includes Stop-and-Wait ARQ and Go-Back-N ARQ, and the random transfer corresponds to selective retransmission ARQ. A description is given hereinbelow in the order of Stop-and-Wait ARQ, Go-Back-N ARQ, selective retransmission ARQ and HARQ.

First, Stop-and-Wait ARQ is a method where a transmitting side transmits the packet signal one by one. If the transmitting side does not receive ACK sent from the receiving side, the transmitting side will retransmit the same packet signal. In Stop-and-Wait ARQ, the ARQ window size is 1. A description is given here assuming that the base station apparatus 10 is the transmitting side. FIG. 6 illustrates a brief overview of Stop-and-Wait ARQ controlled by the radio control unit 28. The top row of FIG. 6 is a time chart corresponding to a transmit/receive operation of the base station apparatus 10. The bottom row of FIG. 6 is a time chart corresponding to a transmit/receive operation of the terminal apparatus 12. Assume herein that the packet signal containing data is transmitted in the downlink direction. In FIG. 6, the aforementioned frames are indicated as "F1" to "F11". Though each time slot in each frame is used in order for the base station apparatus 10 to transmit the packet signal to the terminal apparatus 12, no distinction is made here between the time slots and thus the frame is simply indicated as frame F.

Suppose here that the period for the ARQ retransmission time-out is 3 frames. The base station apparatus 10 transmits the packet signal to which a sequence number is appended. Though the detail will be discussed later, each packet signal contains each PDU to which the sequence number is appended. The base station apparatus 10 does not transmit the next PDU until it receives ACK of the PDU transmitted. The base station apparatus 10 assigns the sequence numbers in order starting from "0". In FIG. 6, the base station apparatus 10 transmits a PDU of sequence number "0" using F1, and the terminal apparatus 12 receives this PDU. In F2, the terminal apparatus 12 transmits ACK for the PDU received, and the base station apparatus 10 receives this ACK. Here, when the base station apparatus 10 succeeds in receiving the ACK, it is regarded that PDUs prior to the sequence number corresponding to the received ACK have been transmitted normally. Then, in F4, the base station apparatus 10 transmits a PDU of sequence number "1". Since this PDU is not received by the terminal apparatus 12, ACK for this PDU is not transmitted from the terminal apparatus 12. As a result, ARQ retransmission time-out occurs in F6. At that time, the base station apparatus 10 retransmits the PDU of sequence number "1" using F7. When a block survival period has elapsed after the PDU, whose ACK is not received, has been first transmitted, the base station apparatus 10 discards said PDU and transmits the next PDU.

To enable ARQ, the base station apparatus 10 appends a sequence number to an SN field of MAC header (described later) at the time of transmitting the PDU. The sequence numbers are managed for each service flow, and those used for one service flow will not affect those used for the other services. To transmit ACK in ARQ for the received data, the terminal apparatus 12 uses the uplink time slots which are paired with the downlink time slots. The terminal apparatus 12 stores the sequence numbers, which have been received normally, in an ACK SN-field within the MAC header as ACK of ARQ.

Go-Back-N ARQ is a method where the transmitting side transmits PDUs continuously. If the transmitting side does not receive ACK sent from the receiving side, the transmitting side will retransmit the packet signals including the packet signal to be associated with said ACK and the subsequent packet signals. FIG. 7 illustrates a brief overview of GO-Back-N ARQ controlled by the radio control unit 28. Suppose here that the ARQ window size is 3 and the period for the ARQ retransmission time-out is 3 frames. Similar to FIG. 6, the base station apparatus 10 transmits the packet signal to which a sequence number is appended. Even if ACK of the PDU transmitted is not received but as long as data is within the ARQ window size, the base station apparatus 10 will transmit the next PDU continuously. The base station apparatus 10 assigns the sequence numbers in order starting from "0". In FIG. 7, the base station apparatus 10 transmits a PDU of sequence number "0" using F1, and the terminal apparatus 12 receives this PDU. In F2, the base station apparatus 10 transmits a PDU whose sequence number is "1" even if ACK for the PDU of sequence number "0" is not received. In F3, too, the base station apparatus 10 transmits a PDU whose sequence number is "2" in a similar manner.

On the other hand, the terminal apparatus 12 receives the PDUs whose sequence numbers are "0" to "2" in F1 to F3 and transmits ACK for each of the PDUs in F2 and F4. Here, when the base station apparatus 10 succeeds in receiving the ACKs, it is regarded that PDUs prior to the sequence numbers corresponding to the received ACKs have been transmitted normally. Then, in F4, the base station apparatus 10 transmits a PDU of sequence number "3". Since this PDU is not received by the terminal apparatus 12, ACK for this PDU is not transmitted from the terminal apparatus 12. Nevertheless, the base station apparatus 10 transmits PDUs of sequence numbers "4" and "5" in F5 and F6. In F6, an ARQ retransmission time-out occurs. At that time, the base station apparatus 10 retransmits a PDU of sequence number "3" in F7. That is, when an ARQ retransmission time-out occurs, the base station apparatus 10 retransmits all PDUs which have been transmitted after the PDU whose ACK is not received. Further, the base station apparatus 10 and the terminal apparatus 12 repeat the similar processing. When a block survival period has elapsed after the PDU, whose ACK is not received, has been first transmitted, the base station apparatus 10 discards said PDU and transmits the next PDU.

Selective retransmission ARQ is a method where the transmitting side transmits PDUs continuously. If the transmitting side does not receive ACK sent from the receiving side, the transmitting side will retransmit the packet signal corresponding to said ACK. FIG. 8 illustrates a brief overview of selective retransmission ARQ controlled by the radio control unit 28. Suppose here that the ARQ window size is 3 and the period for the ARQ retransmission time-out is 3 frames. Similar to FIG. 6, the base station apparatus 10 transmits the packet signal to which a sequence number is appended. Even if ACK of the PDU transmitted is not received but as long as data is within the PDU window size, the base station apparatus 10 will transmit the next PDU continuously. The base station apparatus 10 assigns the sequence numbers in order starting from "0". In FIG. 8, the base station apparatus 10 transmits a PDU of sequence number "0" using F1, and the terminal apparatus 12 receives this PDU. In F2, the base station apparatus 10 transmits a PDU whose sequence number is "1" even if ACK for the PDU of sequence number "0" is not received. In F3, too, the base station apparatus 10 transmits a PDU whose sequence number is "2" in a similar manner.

On the other hand, the terminal apparatus 12 receives the PDUs whose sequence numbers are "0" to "2" in F1 to F3 and transmits ACK for each of the PDUs in F2 and F4. Here, when the base station apparatus 10 succeeds in receiving the ACKs, it is regarded that PDUs of the sequence numbers corresponding to the received ACKs have been transmitted normally. Then, in F4, the base station apparatus 10 transmits a PDU of sequence number "3". Since this PDU is not received by the terminal apparatus 12, ACK for this PDU is not transmitted from the terminal apparatus 12. Nevertheless, the base station apparatus 10 transmits the sequence numbers "4" and "5" in F5 and F6. In F6, an ARQ retransmission time-out for the PDU of sequence number "3" occurs. At that time, the base station apparatus 10 retransmits the sequence number "3" in F7. That is, when an ARQ retransmission time-out occurs, the base station apparatus 10 retransmits the PDU whose ACK is not received. Further, the base station apparatus 10 and the terminal apparatus 12 repeat the similar processing. When a block survival period has elapsed after the PDU, whose ACK is not received, has been first transmitted, the base station apparatus 10 discards said PDU and transmits the next PDU.

HARQ is a retransmission method where the packet error correction rate is improved by combining a retransmission control with FEC. Here, IR (Incremental Redundancy) HARQ is used as HARQ. IR-HARQ is a method for improving the error correction rate by the use of punctured patterns. If error correction fails, the transmitting side will transmit only the initial punctured portion of data. At that time, the amount of data to be transmitted drops and therefore the data are transmitted using a reduced modulation scheme. The receiving side can improve the error correction rate by supplementing the puncture with the initial transmission data. Parameters are stored in signal symbols to distinguish between punctured coded data and punctured pattern data and between ACK and NACK.

FIGS. 9A to 9I illustrate a brief overview of HARQ controlled by the radio control unit 28 of FIG. 5. FIG. 9A shows user data transmitted initially from the base station apparatus 10. Given here are user data "A0" to "A8". FIG. 9B shows a result of FEC coding. Here, the convolutional coding with the coding rate of 1/2 is performed and, as a result, coded data of "X0" and "Y0" to "X8" and "Y8" are generated. FIG. 9C shows a result obtained when punctured coding is performed on the coded data of FIG. 9B. FIG. 9D shows data transmitted from the base station apparatus 10. As shown in FIG. 9D, the punctured coded results are arranged serially. FIG. 9E shows a result obtained when punctured decoding is performed on a result received by the terminal apparatus 12. Here, if the result of punctured decoding performed contains no error, the terminal apparatus 12 will reproduce the user data by executing Viterbi decoding. If, on the other hand, the result of punctured decoding performed contains any error, the terminal apparatus 12 will transmit NACK to the base station apparatus 10.

FIG. 9F shows the punctured portions of data in the punctured pattern of FIG. 9C. When the base station apparatus 10 receives NACK sent from the terminal apparatus 12, the base station apparatus 10 extracts the punctured portions of data. FIG. 9G shows transmitted data when retransmitted from the base station apparatus 10. The punctured portions of data shown in FIG. 9F are shown in FIG. 9G. FIG. 9H shows the punctured portions of data received by the terminal apparatus 12. FIG. 9I shows a result where the puncture has been interpolated using an IR method. The terminal apparatus 12 decodes the data which are the result shown in FIG. 9I, and reproduces the user data. If the base station apparatus 10 receives NACK after sending the punctured patterns, the base station apparatus 10 will retransmit the punctured coded PDUs. If neither NACK nor ACK can be received from the terminal apparatus 12, the base station apparatus 10 will retransmit the punctured coded PDUs.

When executing HARQ, the base station apparatus 10 appends the sequence numbers similarly to when executing ARQ. However, the sequence numbers in HARQ are not contained in the MAC header but contained in the data symbols. When transmitting HARQ-ACK for the received data, the terminal apparatus 12 uses an uplink time slot which is paired with the downlink time slot.

(3) Structure of Packet Signal

FIGS. 10A to 10D show a structure of signal symbols generated by the radio control unit 28 of FIG. 5. Here, FIG. 10A corresponds to uplink signal symbols, whereas FIG. 10B corresponds to downlink signal symbols. Accordingly, the symbols as shown in FIG. 10A are generated by the terminal apparatus 12. MI indicates a modulation parameter notification, and MR indicates a modulation parameter request. PC indicates a transmit power control request, and TC indicates a time alignment control request. HC is set by a transmitting side when HARQ retransmission control is performed, and HA is responded by a receiving side when HARQ retransmission control is performed. ED is used to detect the error in the signal symbols.

FIG. 10C shows a structure of HC field. As shown in FIG. 10C, HC is 4-bit data and contains "with/without retransmission", "type of puncture", and "HARQ SN". "With/without retransmission" indicates whether HARQ retransmission is to be carried out or not. "Type of puncture" indicates the puncture type of transmit data, and indicates punctured coded data or punctured data. HARQ SN indicates the sequence number of HARQ. FIG. 10D shows a structure of HA field. As shown in FIG. 10D, HA is 4-bit data and contains "with/without ACK", "type of ACK", and "HARQ ACK SN". "With/without ACK" indicates whether there is an HARQ-ACK or not. "Type of ACK" indicates the type of HARQ ACK, and indicates ACK or NACK. "HARQ ACK SN" indicates the sequence number of HARQ ACK.

FIGS. 11A and 11B show a structure of data symbols generated by the radio control unit 28 of FIG. 5. In FIG. 11A, a CI bit used to identify the type of channel is set in the beginning of data symbols. Following the CI, a MAC header and a payload are assigned. Note that a combination of MAC header and payload corresponds to the aforementioned PDU. A 16-bit CRC and a tail bit are set in a posterior part of the data symbols. Here, the tail bit is appended bit data required for the decoding in error correction. Note that data symbols are modulated using a modulation scheme specified by MI of the signal symbol.

FIG. 11B shows a structure of MAC header. "PF" is a flag indicating the packing state of payload. The packing will be discussed later. When PF is 0, data in the payload are not packed; and when PF is 1, the data in the payload is packed. "FF" is a flag indicating the fragmented state of payload. The fragmenting is a processing that divides data when the data whose size is larger than that of the payload are to be transmitted. The detailed description of fragmenting processing is omitted here. When FF is 0, the data in the payload is not fragmented; and when FF is 1, the data in the payload is fragmented.

"AF" is a flag indicating whether an SN field for ARQ is valid or invalid. If valid, an SN field exists in the MAC header. "AAF" is a flag indicating whether an ACK SN field for ARQ ACK is valid or invalid. If valid, an ACK SN field exists in the MAC header. "NR" is a flag that cannot be ARQ-received and is used when the receiving side conveys the stop/restart of retransmission control to the transmitting side. "Len" indicates the length of data area in a frame format within a single sub-channel, in units of byte. "SN" is a sequence number and indicates a value incremented per service flow (mod 256). "SN" is an optional field available only when AF is valid. "ACK SN" is a field used to store the results of ARQ, and indicates the sequence number of ARQ ACK. "ACK SN" is a value incremented per PDU (mod 256), and indicates a sequence number that has been received normally. Note that "SN" is an optional field available only when AF is valid.

(4) Packing Processing

As described above, the IF unit 26 receives data to be transmitted, from the not-shown wired network. On the other hand, the modem unit 24 to the RF unit 20 transmit packet signals containing payloads. Here, the radio control unit 28 compares the size of data to be transmitted, with the size of data that can be assigned to the payloads. If the size of the former is smaller than the size of the latter, the radio control unit 28 will determine to do any one of the following three operations for the payload contained in the packet signal. The three operations are the aggregating of a plurality of data, the aggregating of the data and the control signal, and not to execute the aggregating. Here, the control signal is not the control signal to be transmitted by signal symbols but the control signal to be transmitted by data symbols. As preconditions, the execution of retransmission control is defined for the control signal, and any one of the above-described selective ARQ and so forth is defined as the type of retransmission control. For data, on the other hand, the with/without of retransmission control and the type of retransmission control are changed as appropriate in the above-described service flow change request FACCH, the service flow change response FACCH and the like.

Regardless of whether a plurality of data or a combination of data and control signal are to be aggregated, the radio control unit 28 determines that the aggregating is not to be executed if the retransmission control is not performed on either one of the plurality of data and the combination of data and control signal and if the retransmission control is performed on the other one of them. That is, if the presence or absence of retransmission control differs, the radio control unit 28 will determine not to execute the aggregating. On the other hand, when a plurality of data are to be aggregated, the radio control unit 28 determines that the plurality of data are to be aggregated if no retransmission control is performed on any of the plurality of data. Also, when a plurality of data are to be aggregated, the radio control unit 28 verifies the type of retransmission control if the retransmission control is performed on every one of the plurality of data. Here, the type of retransmission control corresponds to the selective retransmission ARQ and so forth. If the type of retransmission control is the same selective retransmission ARQ and so forth but the parameters such as the ARQ window defined therefor differs, a different type of retransmission control may be implemented. If the type of retransmission control agrees with each other, the radio control unit 28 will determine the aggregating of the plurality of data.

If a combination of data and control signal is to be aggregated, the radio control unit 28 will determine that the aggregating is not to be executed if the retransmission control is not performed on the data. If, on the other hand, the retransmission control is performed on the data, the radio control unit 28 will determine the aggregating of the data signal and the control signal even if the type of retransmission control does not agree. At that time, if the type of retransmission control does not agree with each other, the radio control unit 28 will change the type of retransmission control for the control signal so that the type of retransmission control for the data signal can agree with each other. For instance, if the retransmission control for the data is HARQ and the retransmission control for the control signal is selective retransmission ARQ, the radio control unit 28 will change the retransmission control for the control signal, to HARQ. If the retransmission control for the data is the same as that for the control signal but the values of ARQ window differ, the radio control unit 28 will change the value of ARQ window in the retransmission control for the control signal.

As described above, the radio control unit 28 assigns sequence numbers to payloads. For example, when performing ARQ, the radio control unit 28 has a sequence number contained in a MAC header; and when performing HARQ, the radio control unit 28 has a sequence number contained in a signal symbol. Here, even in a case where the aggregating is determined in payloads, the sequence numbers are assigned to the payloads the same way as in a case where the aggregating is not done.

FIGS. 13A to 13C show a structure of data symbols generated by the radio control unit 28 of FIG. 5. FIG. 13A and FIG. 13B each shows a structure of data symbols when the packing is not executed. In either one of FIG. 13A and FIG. 13B, each payload is constituted by one SDU. Here, the SDU corresponds to the aforementioned data. FIG. 13A shows a format when ARQ is not performed, and FIG. 13B shows a format when ARQ is performed. Comparing FIG. 13A and FIG. 13B with each other, the presence or absence of SN in the MAC header differs. FIG. 13C shows data symbols when the packing is executed. Assume here that ARQ is not performed. As shown in FIG. 13C, a plurality of SDUs are assigned to a payload. Note that PSH is assigned anterior to each SDU. PSH is a sub-header appended when the packing is executed and, as shown in FIG. 13C, PSH contains the data length of SDU posterior thereto as Len.

This structure may be implemented hardwarewise by elements such as a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

Figure 14:
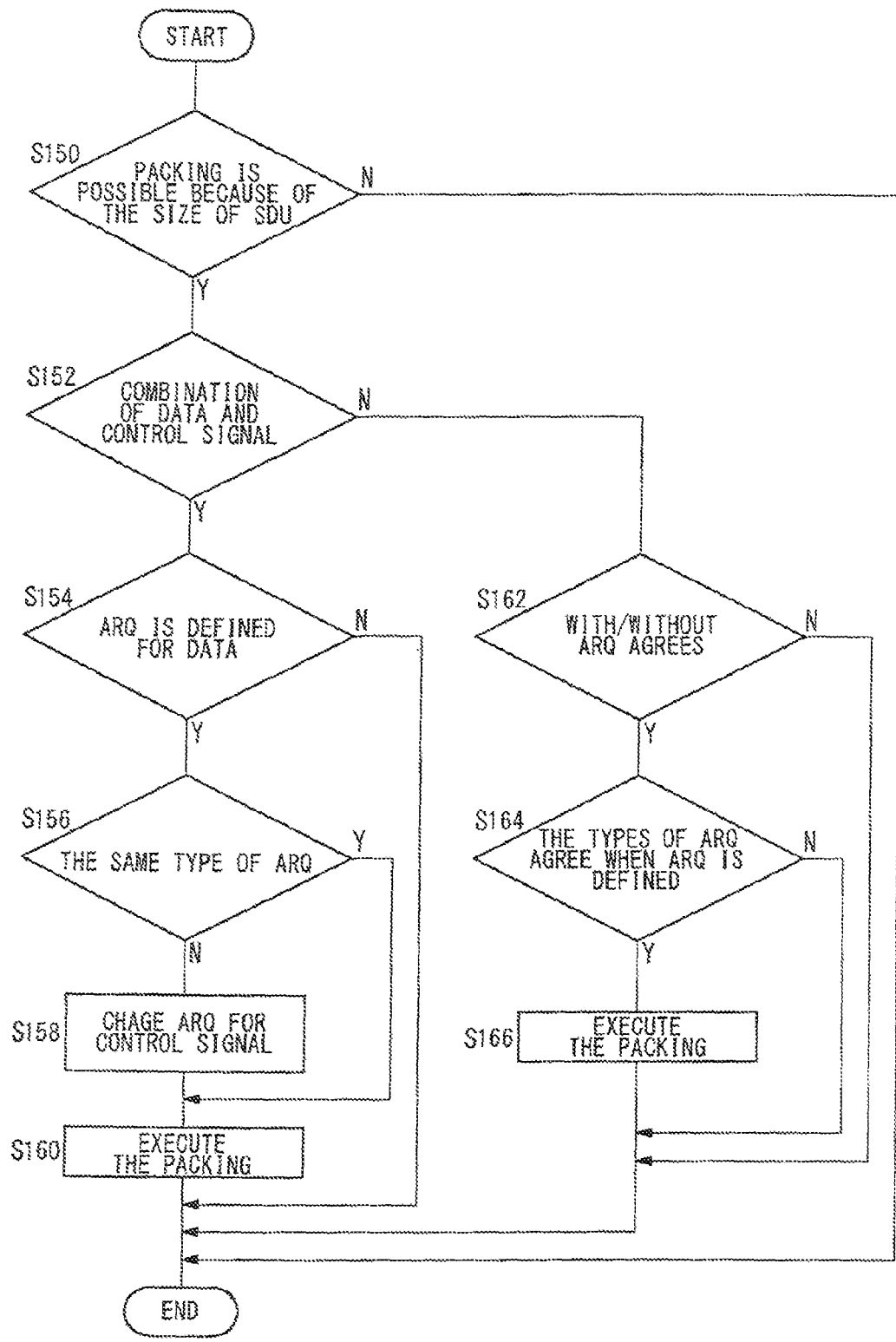
FIG. 14 is a flowchart showing a packing processing in the radio control unit of FIG. 5.

An operation of the base station apparatus 10 structured as above will now be described. FIG. 14 is a flowchart showing a packing processing in the radio control unit 28 of FIG. 5. If the packing is possible because of the size of SDU (Y of S150), namely, if the size of SDU is smaller than the size of payload, the radio control unit 28 will check the presence or absence of ARQ for data in the case of a combination of data and control signal (Y of S152) Here, ARQ is a concept that encompasses HARQ. If ARQ is defined for the data signal (Y of S154) and if ARQ is not of the same type (N of S156), the radio control unit 28 will change ARQ defined for the control signal (S158). If, on the other hand, it is of the same type (Y of S156), the radio control unit 28 will skip the processing of Step 158. Then the radio control unit 28 determines to execute the packing (S160). If ARQ is not defined for the data signal (N of S154), the radio control unit 28 will determine not to execute the packing and terminate the processing.

If the combination of data and control signal is not to be aggregated (N of S152), namely, if a combination of a plurality of data is to be aggregated, the radio control unit 28 will check to see if the presence or absence of ARQ for the plurality of data agrees with one another. If the presence or absence of ARQ agrees (Y of S162) and the type of ARQ with the presence of ARQ agrees (Y of S164), the radio control unit 28 will determine to execute the packing (S166). If the presence or absence of ARQ for the plurality of data agrees on the condition that there is no ARQ, the radio control unit 28 will determine to execute the packing, too. If the presence or absence of ARQ does not agree (N of S162) or the type of ARQ with the presence of ARQ does not agree (N of S164), the radio control unit 28 will determine not to execute the packing and terminate the processing. If the packing is not possible because of the size of SDU (N of S150), the radio control unit 28 will determine not to execute the packing and terminate the processing.

According to the modification of the exemplary embodiment, when retransmission control is performed on a plurality of data, the aggregating is executed if the type of retransmission control also agrees. Hence, even in the case of aggregated data, the retransmission control can be performed thereon the same way as with the data which are not aggregated. This can reduce the complexity of processing. Also, when retransmission control is performed on a plurality of data, the aggregating is executed if the type of retransmission control also agrees. Hence, even though there are a plurality of kinds of data, at least two pieces of data can be aggregated by taking the compatibility of combination into account. Since a plurality of data are aggregated, the transmission efficiency can be enhanced. Also, even if the types of retransmission control do not agree but as long as the presence or absence of retransmission control agrees, the data and the control signals are aggregated, so that the transmission efficiency can be enhanced.

If the types of retransmission control do not agree, the type of retransmission control for the control signal will be made to agree with the type of retransmission for the data. Thus, the types of both the retransmission controls are matched. Since the types of both the retransmission controls agree, the retransmission control can be performed the same way as with the data that are not aggregated and therefore the complexity of processing can be reduced. Even if the type of retransmission control for the control signal changes, the retransmission control can still be performed and therefore the deterioration in the quality of the control signal can be suppressed. Even if the aggregating is executed, the increase in information can be suppressed because the sequence numbers are assigned to the payloads as a whole. Since the sequence numbers are assigned to the payloads as a whole, the retransmission control can be performed on the aggregated data the same way as with the data that are not aggregated.

The present invention has been described based upon illustrative embodiments. These exemplary embodiments are intended to be illustrative only and it will be obvious to those skilled in the art that various modifications to constituting elements and processes could be developed and that such modifications are also within the scope of the present invention.

While the preferred embodiments of the present invention have been described using specific terms, such description is for illustrative purposes only, and it is to be understood that changes and variations may be further made without departing from the spirit or scope of the appended claims.

What is claimed is:

1. A transmitting apparatus, comprising:
a generator which generates a packet signal containing a control signal and a data signal;
a transmitter which transmits the packet signal generated by the generator; and
a control unit which performs a first retransmission control or a second retransmission control on the packet signal transmitted by the transmitter, wherein the generator has first control information for the first retransmission control contained in the control signal and has second control information for the second retransmission control contained in a MAC header of the data signal, and wherein a data size of control information for the first retransmission control is smaller than that of control information for the second retransmission control.

2. A transmitting apparatus according to claim 1, wherein the information amount of the first control information in the generator is smaller than that of the second control information.

3. A transmitting apparatus according to claim 1, wherein when the first retransmission control is performed by the control unit, the generator skips having the second control information contained in the data signal; and when the second retransmission control is performed by the control unit, the generator uses dummy information as the first control information.

4. A transmitting apparatus according to claim 1, wherein a window size of the first retransmission control performed by the control unit is smaller than that of the second retransmission control.

5. A communication method, comprising:
generating a packet signal that contains a control signal and a data signal;
transmitting the packet signal generated; and
performing a first retransmission control or a second retransmission control on the packet signal transmitted, wherein the generating is such that first control information for the first retransmission control is contained in the control signal and second control information for the second retransmission control is contained in a MAC header of the data signal, and wherein a data size of control information for the first retransmission control is smaller than that of control information for the second retransmission control.

6. A computer program product comprising a non-transitory computer-readable medium containing executable instructions that when executed perform a method of communication, the method comprising:

generating a packet signal that contains a control signal and a data signal;

transmitting the packet signal generated; and performing a first retransmission control or a second retransmission control on the packet signal transmitted, wherein the generating is such that first control information for the first retransmission control is contained in the control signal and second control information for the second retransmission control is contained in a MAC header of the data signal, and wherein a data size of control information for the first retransmission control is smaller than that of control information for the second retransmission control.

7. A transmitting apparatus, comprising:

a transmitter which transmits a packet signal containing a payload; and a control unit which determines any one of aggregating a plurality of data signals, aggregating a data signal and a control signal, and no aggregating for the payload contained in the packet signal to be transmitted from the transmitter, wherein the transmitter defines the presence or absence of retransmission control and a plurality of types of retransmission controls, and wherein when retransmission control is performed by the transmitter and the control unit determines that the types of retransmission controls agree, the control unit determines to aggregate the plurality of data; and when retransmission control is performed by the transmitter and the control unit determines that the types of retransmission controls do not agree, the control unit determines to aggregate the data signal and the control signal, wherein the plurality of types of retransmission control comprises a first retransmission control and a second retransmission control, wherein first control information for the first retransmission control is contained in the control signal and is smaller than that of second control information for the second retransmission control contained in a MAC header of the data signal.

8. A transmitting apparatus according to claim 7, wherein the aggregating of the data signal and the control signal is determined and the types of retransmission controls do not agree, the control unit changes the type of retransmission control for the control signal so that the type of retransmission control for the control signal agree with the type of retransmission control for the data signal.

9. A transmitting apparatus according to claim 7, wherein when the control unit determines the aggregating, the transmitter performs retransmission control by assigning sequence numbers to the payload.

10. A communication method, comprising:

determining any one of aggregating a plurality of data signals, aggregating a data signal and a control signal, and no aggregating for a payload contained in a packet signal; and transmitting the packet signal containing the payload, wherein the transmitting defines the presence or absence of retransmission control and a plurality of types of retransmission controls, and wherein when retransmission control is performed and the types of retransmission controls are determined to agree, the determining determines the aggregating of the plurality of data; and when retransmission control is performed and the types of retransmission controls are determined to not agree, the determining determines the aggregating of the data signal and the control signal, wherein the plurality of types of retransmission control comprises a first retransmission control and a second retransmission control, wherein first control information for the first retransmission control is contained in the control signal and is smaller than that of second control information for the second retransmission control contained in a MAC header of the data signal.

11. A computer program product comprising a non-transitory computer-readable medium containing executable instructions that when executed perform a method of communication, the method comprising:

determining any one of aggregating a plurality of data signals, aggregating a data signal and a control signal, and no aggregating for a payload contained in a packet signal; and transmitting the packet signal containing the payload, wherein the transmitting defines the presence or absence of retransmission control and a plurality of types of retransmission controls, and wherein when retransmission control is performed and the types of retransmission controls are determined to agree, the determining determines the aggregating of the plurality of data; and when retransmission control is performed and the types of retransmission controls are determined to not agree, the determining determines the aggregating of the data signal and the control signal, wherein the plurality of types of retransmission control comprises a first retransmission control and a second retransmission control, wherein first control information for the first retransmission control is contained in the control signal and is smaller than that of second control information for the second retransmission control contained in a MAC header of the data signal.

* * * * *